United States Patent
Stephenson et al.

(10) Patent No.: US 7,100,688 B2
(45) Date of Patent: Sep. 5, 2006

(54) FRACTURE MONITORING USING PRESSURE-FREQUENCY ANALYSIS

(75) Inventors: Stanley V. Stephenson, Duncan, OK (US); Jim B. Surjaatmadja, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 572 days.

(21) Appl. No.: 10/251,301

(22) Filed: Sep. 20, 2002

(65) Prior Publication Data

US 2004/0206494 A1 Oct. 21, 2004

(51) Int. Cl.
*E21B 47/10* (2006.01)

(52) U.S. Cl. .............. 166/250.1; 166/308.1; 367/32; 702/6

(58) Field of Classification Search .......... 166/250.1, 166/308; 73/152.51, 152.39; 367/32; 702/6
See application file for complete search history.

(56) References Cited

U.S. PATENT DOCUMENTS

| | | | |
|---|---|---|---|
| 4,458,245 A | 7/1984 | Crosnier et al. | 340/853 |
| 4,783,769 A * | 11/1988 | Holzhausen | 367/35 |
| 4,802,144 A | 1/1989 | Holzhausen et al. | 367/35 |
| 4,858,130 A * | 8/1989 | Widrow | 702/11 |
| 5,093,811 A * | 3/1992 | Mellor et al. | 367/35 |
| 5,206,836 A | 4/1993 | Holzhausen et al. | 367/35 |
| 5,417,103 A | 5/1995 | Hunter et al. | 73/37 |
| 5,771,170 A * | 6/1998 | Withers et al. | 702/16 |
| 5,963,508 A * | 10/1999 | Withers | 367/38 |
| 6,192,316 B1 | 2/2001 | Hornby | 702/6 |

FOREIGN PATENT DOCUMENTS

| | | |
|---|---|---|
| EP | 0 456 424 A2 | 11/1991 |
| EP | 0 476 758 A2 | 3/1992 |

OTHER PUBLICATIONS

Boschetti, F., Hornby, P., and Horowitz, F.: "Inferring Geology from Geophysics,*Research on the Analysis and Inversion of Potential Field Data Carried on at CSIRO Exploration& Mining, Nedlands, WA 6009*," Mar. 29, 2000 (from www.agcrc.csiro.au/projects/3054CO/3dmag.html).

Soliman, M. Y., Ansah, J., Stephenson, S., and Mandal, B.: "Application of Wavelet Transform to Analysis of Pressure Transient Data," paper SPE 71571 presented at the 2001 SPE Annual Technical Conference and Exhibition, New Orleans, LA, Sept. 30–Oct. 3.

(Continued)

*Primary Examiner*—Hoang Dang
(74) *Attorney, Agent, or Firm*—Robert A. Kent; C. Clark Dougherty, Jr.

(57) ABSTRACT

Changes occurring downhole during a fracturing process can create or reflect pressure signals. Capturing and evaluating such pressure waves during fracturing enables personnel to monitor, in real time or later, what happens downhole. When a fracture extends, a burst of acoustic noise is embodied in a pressure wave or signal, as is noise coming from other sources. By transforming time-based pressure signals to a frequency base, one can monitor this acoustic noise. In a particular implementation, a waterfall plot of frequency spectra at successive time slices of the original signal is used to determine frequency ridges, such as a ridge of decreasing frequencies indicates fracture extension and a ridge of increasing frequencies indicates either closure or proppant backing up in the fracture. Filtering, such as wavelet filtering, can be used. A fracturing process can be controlled in response to determining whether the fracture is extending.

42 Claims, 21 Drawing Sheets

OTHER PUBLICATIONS

Loth, J.L., Echavarria, E., and Stephenson, S.: "Response to an Induced Transient During Well Fracturing," paper presented at the 2000 International Mechanical Engineering Conference and Exposition, Orlando, Florida, Nov. 5–10.

U.S. patent application Ser. No. 09/697,621 filed Oct. 26, 2000 (Stanley V. Stephenson and John Loth, inventors).

SPE 77598 "Analysis of Generated and Reflected Pressure Waves During Fracturing Reveals Fracture Behavior" by Jim B. Surjaatmadja, et al. 2002.

Paper Entitled "Real–Time Pressure Diagnostics Used to Improve Pretreatment Fracture Design: Case Studies in the Antrim Shale" by G. C. Dozier, et al, dated Feb. 2002.

SPE 16362 Entitled "Detection and Control of Hydraulic Fractures in Water Injection Wells" by G.R. Holzhausen, et al, dated Apr. 1987.

Foreign Communication from a Related Counterpart Application dated Oct. 15, 2004.

* cited by examiner

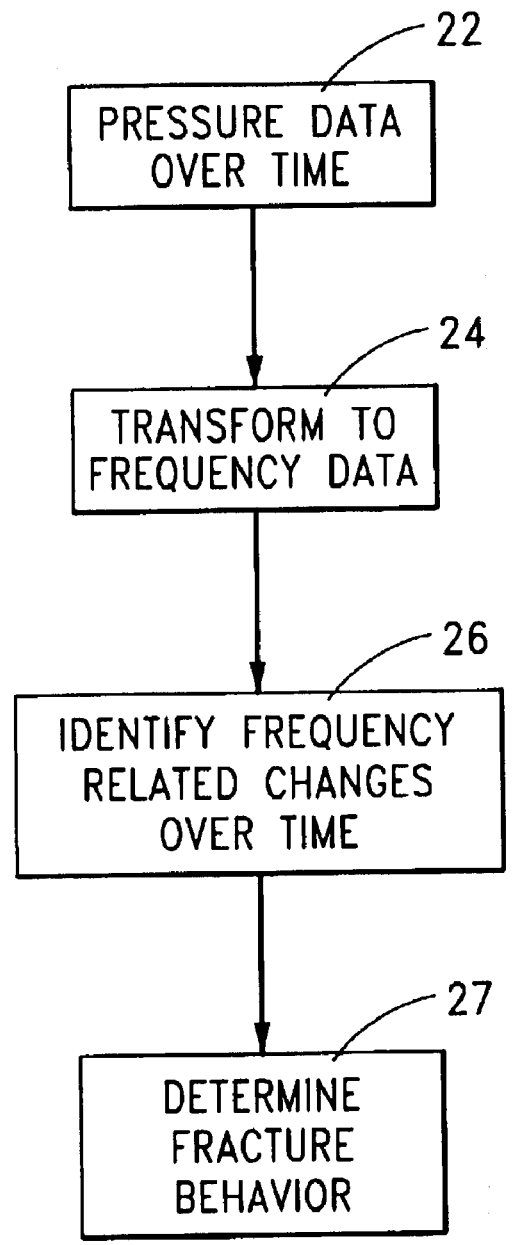
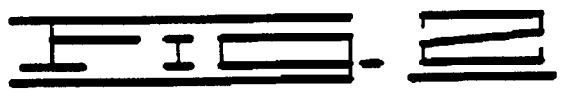

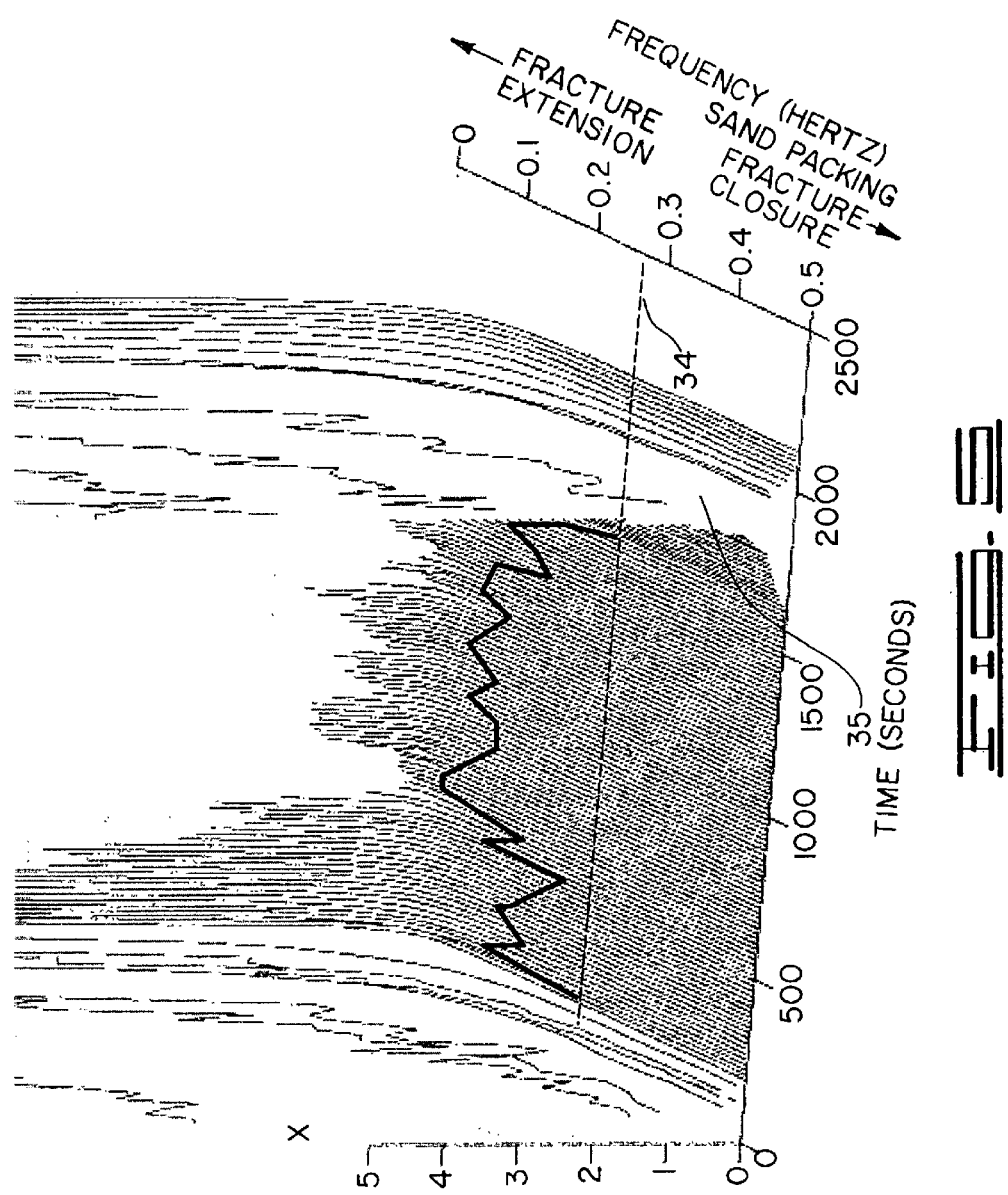

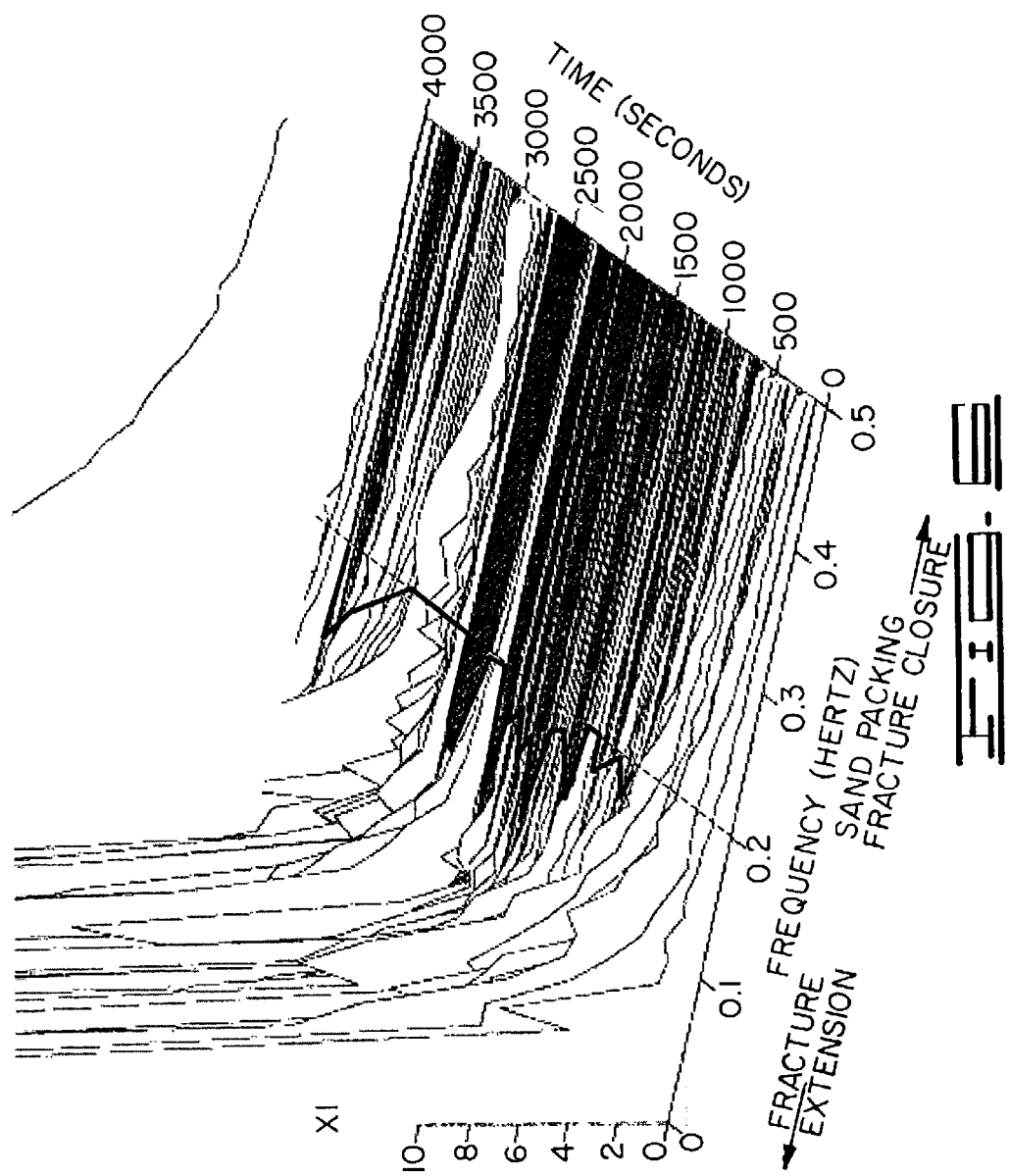

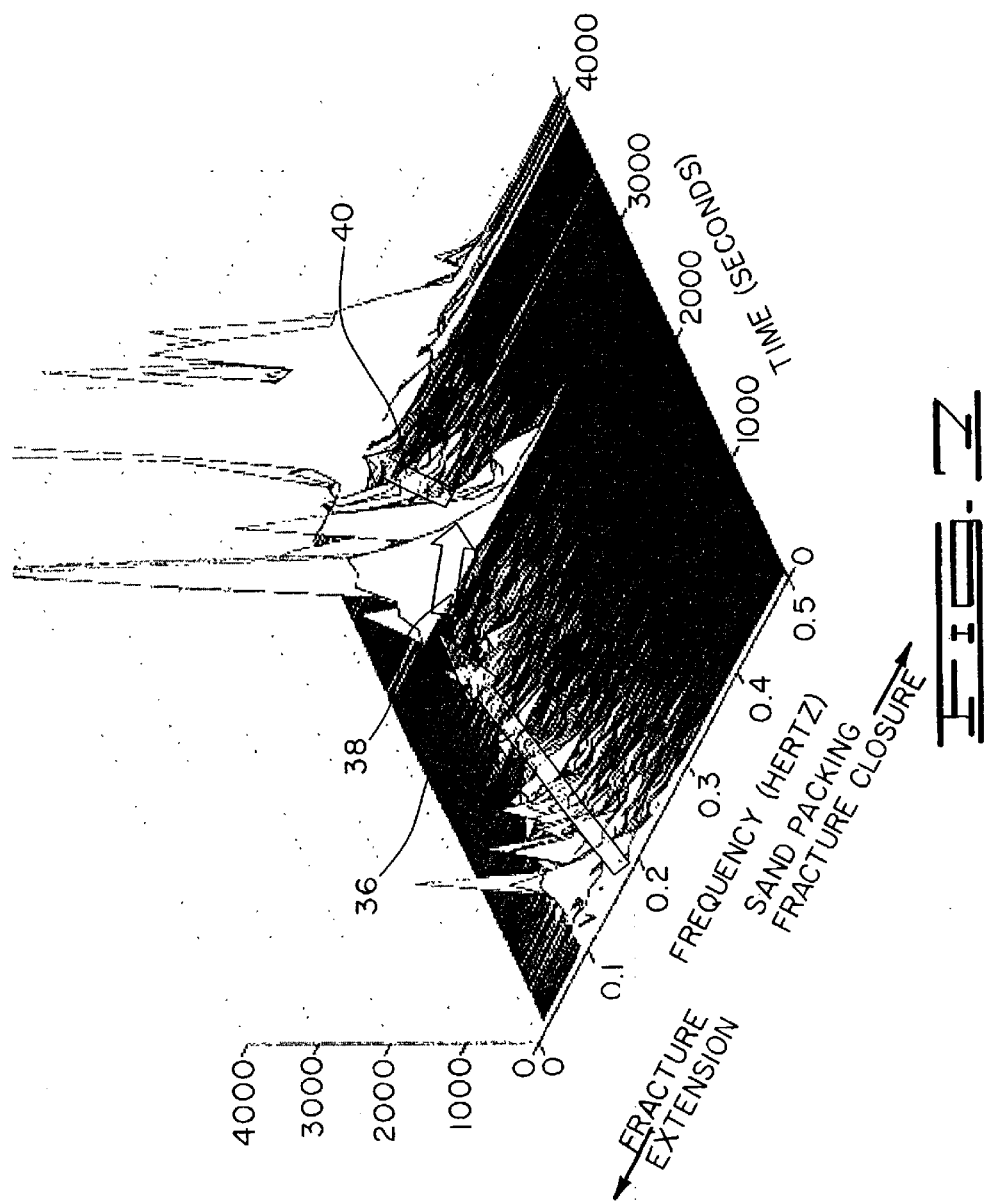

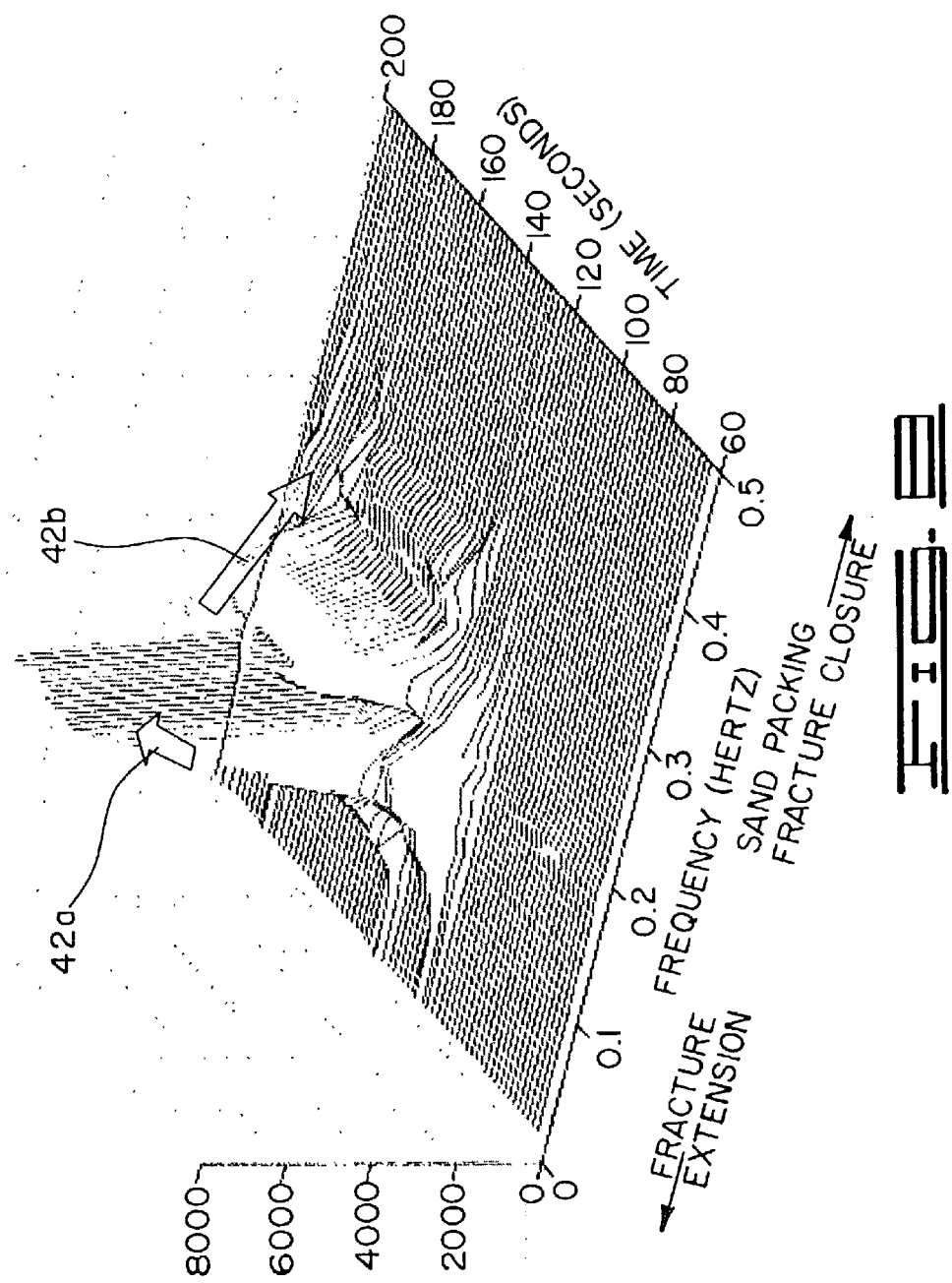

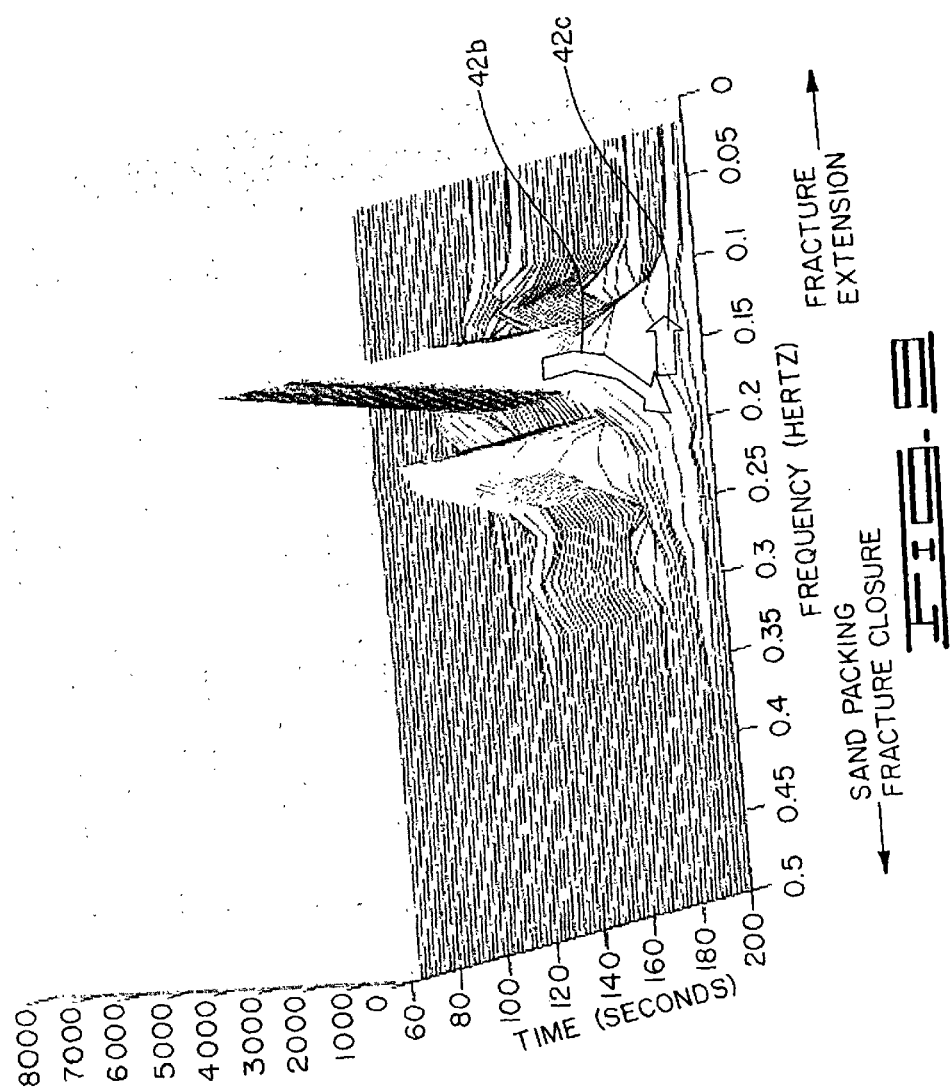

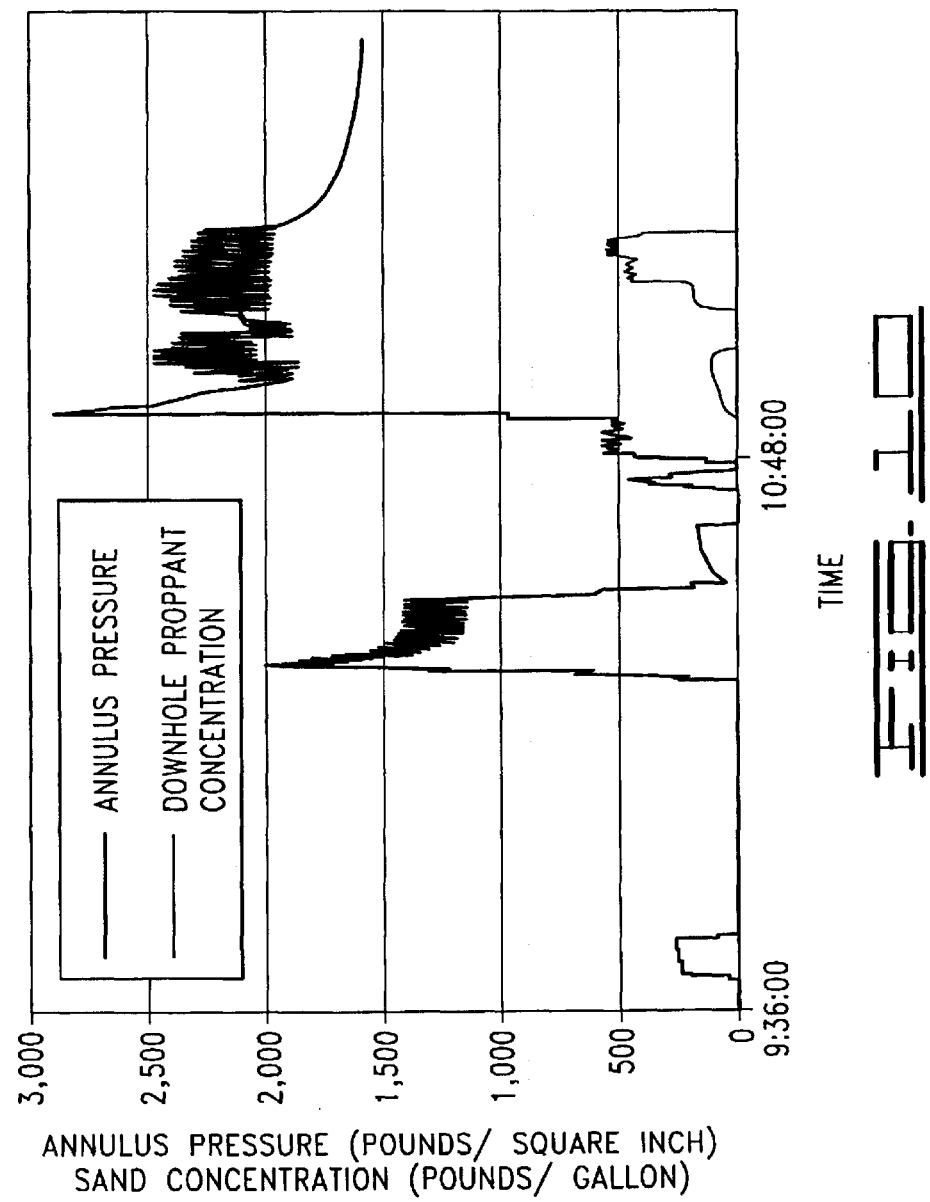

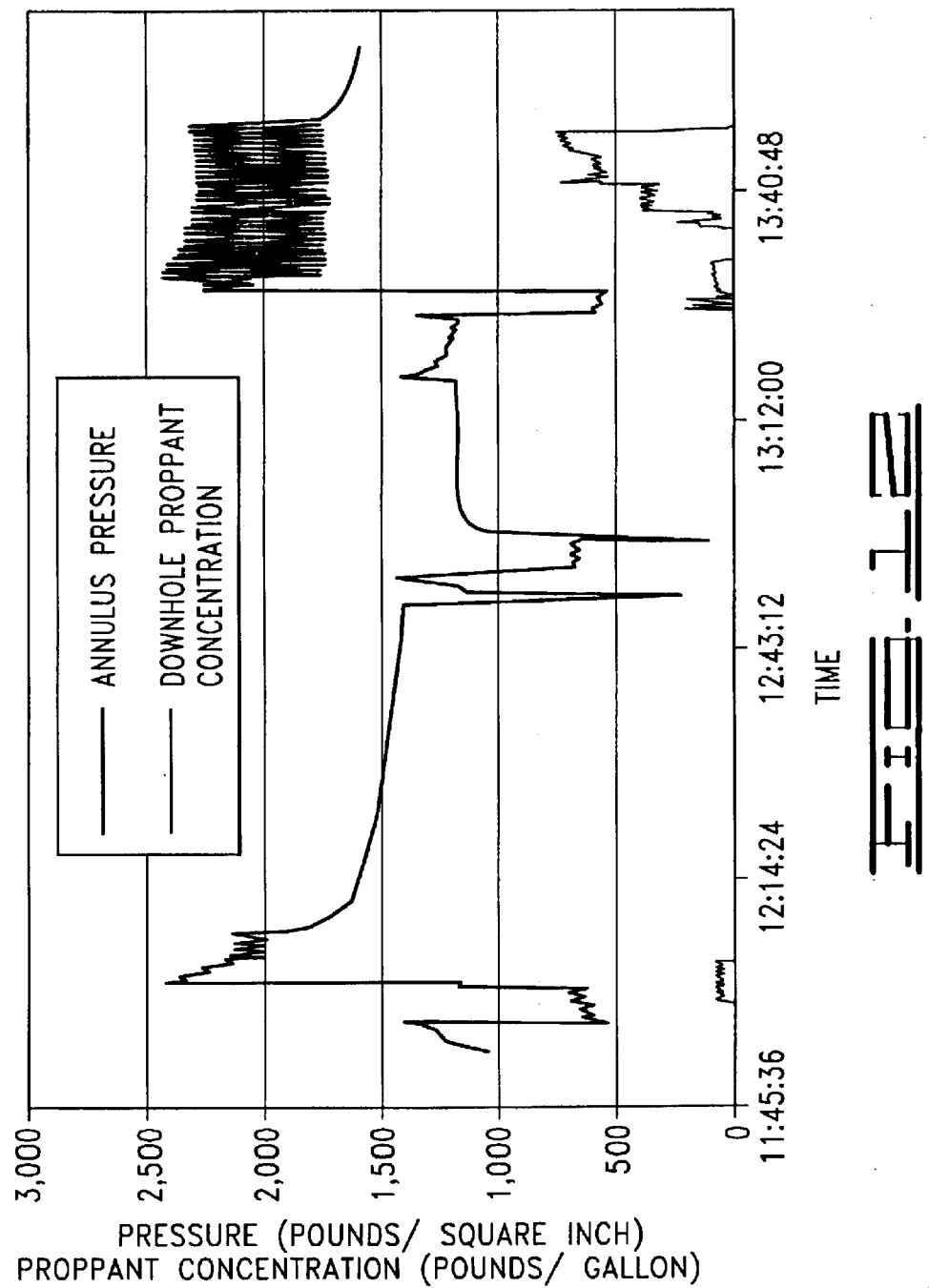

FRACTURE MONITORING USING PRESSURE-FREQUENCY ANALYSIS

BACKGROUND OF THE INVENTION

This invention relates generally to fracturing subterranean formations and to fracture monitoring methods.

There are various uses for fractures created in subterranean formations. In the oil and gas industry, for example, fractures may be formed in a hydrocarbon-bearing formation to facilitate recovery of oil or gas through a well communicating with the formation.

Fractures can be formed by pumping a fracturing fluid into a well and against a selected surface of a formation intersected by the well. Pumping occurs such that a sufficient hydraulic pressure is applied against the formation to break or separate the earthen material to initiate a fracture in the formation.

A fracture typically has a narrow opening that extends laterally from the well. To prevent such opening from closing too much when the fracturing fluid pressure is relieved, the fracturing fluid typically carries a granular or particulate material, referred to as "sand" or "proppant," into the opening of the fracture. This material remains in the fracture after the fracturing process is finished. Ideally, the proppant in the fracture holds the separated earthen walls of the formation apart to keep the fracture open and provides flow paths through which hydrocarbons from the formation can flow at increased rates relative to flow rates through the unfractured formation. In another application, acids are used to create uneven surfaces so that the fracture does not completely close, thus still providing effective flow channels through the fracture.

Such a fracturing process is intended to stimulate (that is, enhance) hydrocarbon production from the fractured formation. Unfortunately, this does not always happen because the fracturing process can damage rather than help the formation (for example, proppant can clog the fracture tip to produce a "screenout" condition).

Stimulating wells that behave nicely (for example, wells that are easily stimulated) allows service companies and operators to follow standard procedures commonly performed on such wells. No special attention needs to be placed upon specifics, such as how the fracture behaves; decisions and actions are based upon the experience the industry has acquired over many years.

However, as the hydrocarbon supply decreases and demand for it increases, the hunt for hydrocarbons becomes more challenging. New technologies, such as fluid chemistry and rheology, or even new stimulation techniques enter the marketplace. These techniques claim to provide better fracture creation, better conductivities, permeability modifications, and more. As these technologies are used, new methods for evaluating the effectiveness of the treatments are needed.

In at least these more challenging situations, fracture behavior is an important aspect in fracturing technology. Many techniques are available for pre-stimulation simulations and post-stimulation analyses of fracture behavior; however, few techniques address fracture behavior during the stimulation process itself. Various fracture behaviors, such as fracture extension, ballooning, and tip screenout are often not known to the operator until after it is too late or even after the job is completed. Therefore, there is a need for real-time analysis or monitoring of fractures.

SUMMARY OF THE INVENTION

The present invention meets the aforementioned need by providing a novel and improved fracture monitoring method and fracturing method.

Certain changes occurring downhole during a fracturing process, such as fracture extension, send different pressure frequency spectra and wave intensities to the surface. In accordance with the present invention, these signals can be processed to reveal information about one or more aspects of the downhole environment. That is, capturing and evaluating generated and reflected pressure waves during fracturing enables personnel to monitor, in real time or later, what happens downhole during fracturing.

Any time a fracture extends, there is a sudden burst of acoustic noise embodied in a pressure wave or signal. Noise coming from other sources also contributes to this signal. By converting the time based pressure signal to a frequency base using a Fourier transform, for example, one can monitor this acoustic noise. In a particular implementation of the present invention, this is implemented with a waterfall plot of frequency spectra at successive time slices of the original signal. In such a waterfall plot, and in accordance with the present invention, a ridge of decreasing frequencies indicates fracture extension and a ridge of increasing frequencies indicates either closure or sand/proppant backing up in the fracture. By summing the area under the spectral plot, one can also get an indication of the energy drop as the fracture extends and sudden rise at a screen out.

A fracture monitoring method in accordance with the present invention comprises: creating frequency spectrum data in response to a pressure in a well sensed over time during a fracturing process performed on the well; and determining from the frequency spectrum data at least one characteristic of a fracture formed by the fracturing process. This can include one or more of the following, for example: determining, in response to a declining frequency defined in the frequency spectrum data, that the fracture is being extended by the fracturing process; determining, in response to an increasing frequency defined in the frequency spectrum data, that the fracture is effectively not being extended by the fracturing process; and determining, in response to an increasing frequency defined in the frequency spectrum, that proppant is backing up in the fracture.

In one embodiment, creating frequency spectrum data includes applying a frequency transform to data of the sensed pressure. Examples of frequency transform include a Fourier Transform in general and a Short Time Fourier Transform in particular.

Creating frequency spectrum data can also include filtering data of the sensed pressure. Such filtering includes wavelet filtering in one embodiment of the present invention.

A fracture monitoring method of the present invention can also be defined as comprising: sensing pressure over time during a fracturing process performed on a well such that pressure data is obtained; making a frequency analysis of the pressure data, including making a waterfall plot of frequency data obtained in response to the pressure data; and using the waterfall plot to determine at least one characteristic of a fracture formed by the fracturing process. Using the waterfall plot in one embodiment of the present invention includes identifying one or both of (1) a declining ridge section for a selected frequency range over a period of time and (2) an increasing ridge section for the selected frequency range.

The present invention can also be defined as a computer-implemented fracture monitoring method, comprising:

receiving in a computer pressure data obtained over time from a well undergoing a fracturing process; performing in the computer a transform on pressure data received in the computer to provide frequency data for selected times of the pressure data; and using the frequency data to determine whether a fracture created by the fracturing process is extending, including determining decreasing and increasing frequency sections within the frequency data.

A fracturing method of the present invention broadly comprises: pumping a fracturing fluid into a well such that a fracture in an adjacent formation forms and pressure signals are generated; sensing the pressure signals; determining frequencies at various times of the sensed pressure signals; creating a plot of the frequencies at the various times; and determining from the plot whether the fracture is extending into the formation. This can further comprise controlling further pumping of the fracturing fluid in response to determining whether the fracture is extending.

Other aspects consistent with the foregoing are included in further definitions of the present invention.

Therefore, from the foregoing, it is a general object of the present invention to provide a novel and improved fracture monitoring method and fracturing method. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 2 is a flow chart of procedures of the present invention.

FIG. 3 shows a waterfall plot for a well A in accordance with the present invention.

FIG. 6 shows a waterfall plot for a well C in accordance with the present invention.

FIG. 8 shows another waterfall plot for well C in accordance with the present invention, including use of wavelet technology and focusing on part of the plot shown in FIG. 7.

FIG. 9 shows a view from the other side of the plot of FIG. 8.

FIG. 10 shows plots of annulus pressure and downhole proppant concentration data for a first fracture of a well D.

FIG. 11 shows a waterfall plot created from the data of FIG. 10 in accordance with the present invention.

FIG. 12 shows plots of annulus pressure and downhole proppant concentration data for a second fracture of well D.

DETAILED DESCRIPTION OF THE INVENTION

Figure 1A:
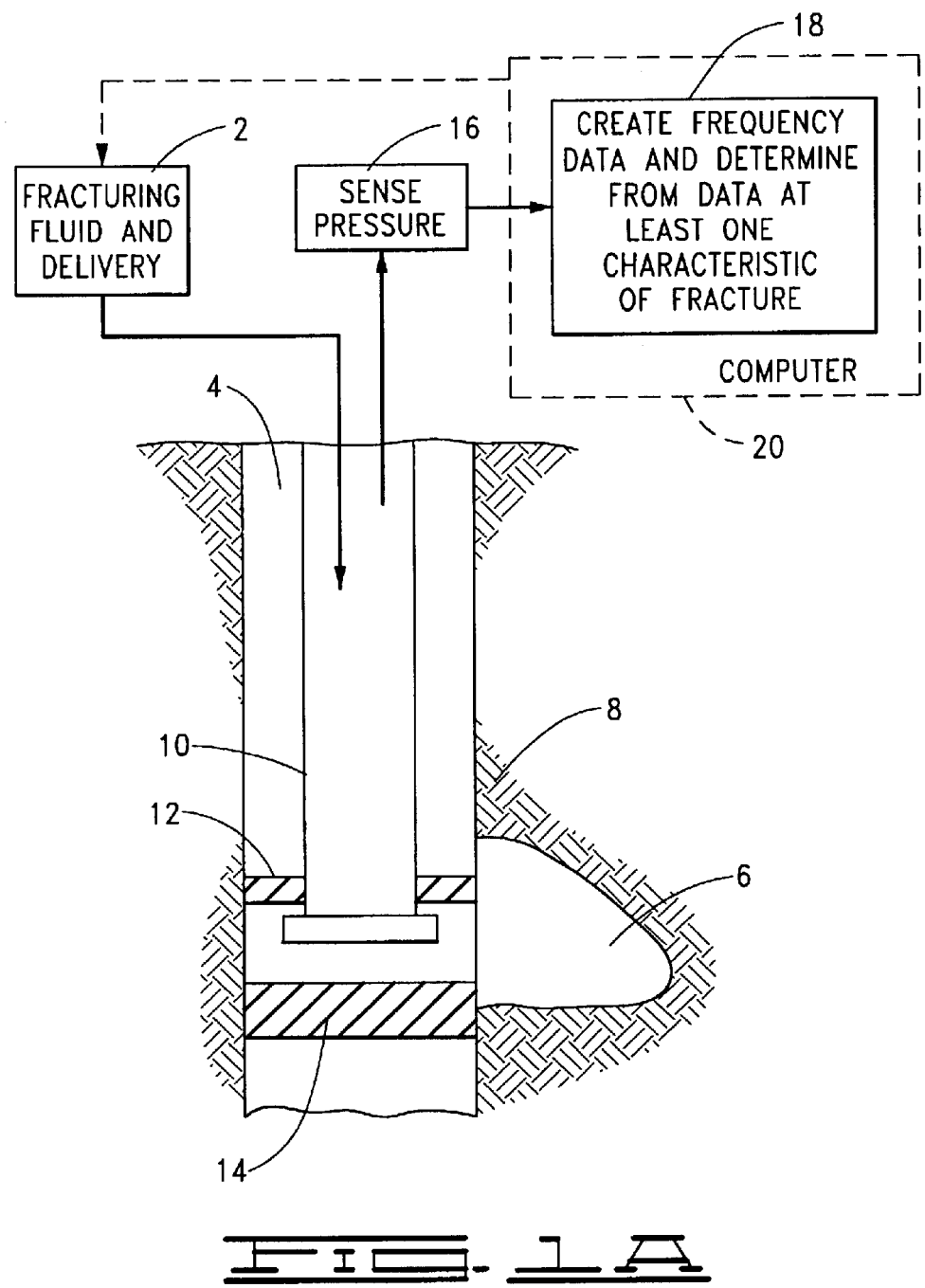
FIG. 1A represents one type of fracturing process using a method of the present invention.

A fracturing process using a method of the present invention is represented in FIG. 1A. This includes pumping a fracturing fluid 2 into a well 4 such that a fracture 6 in an adjacent formation 8 forms and pressure signals are generated. The fracturing fluid 2 can be of any suitable type known in the art, and it is pumped into the well 4 in any suitable manner known in the art. In FIG. 1A, the placement of the fracturing fluid is shown as occurring through a tubing string 10 that extends into a region of the well 4 that is isolated in known manner by suitable known sealing devices 12, 14 (for example, packers). This isolated region enables the fracturing fluid 2 to be exerted against the desired portion of the formation 8 and thereby initiate and extend the fracture 6 (only one wing of which fracture is shown in that a fracture typically extends in two (typically opposite) directions from the wellbore).

Figure 1B:
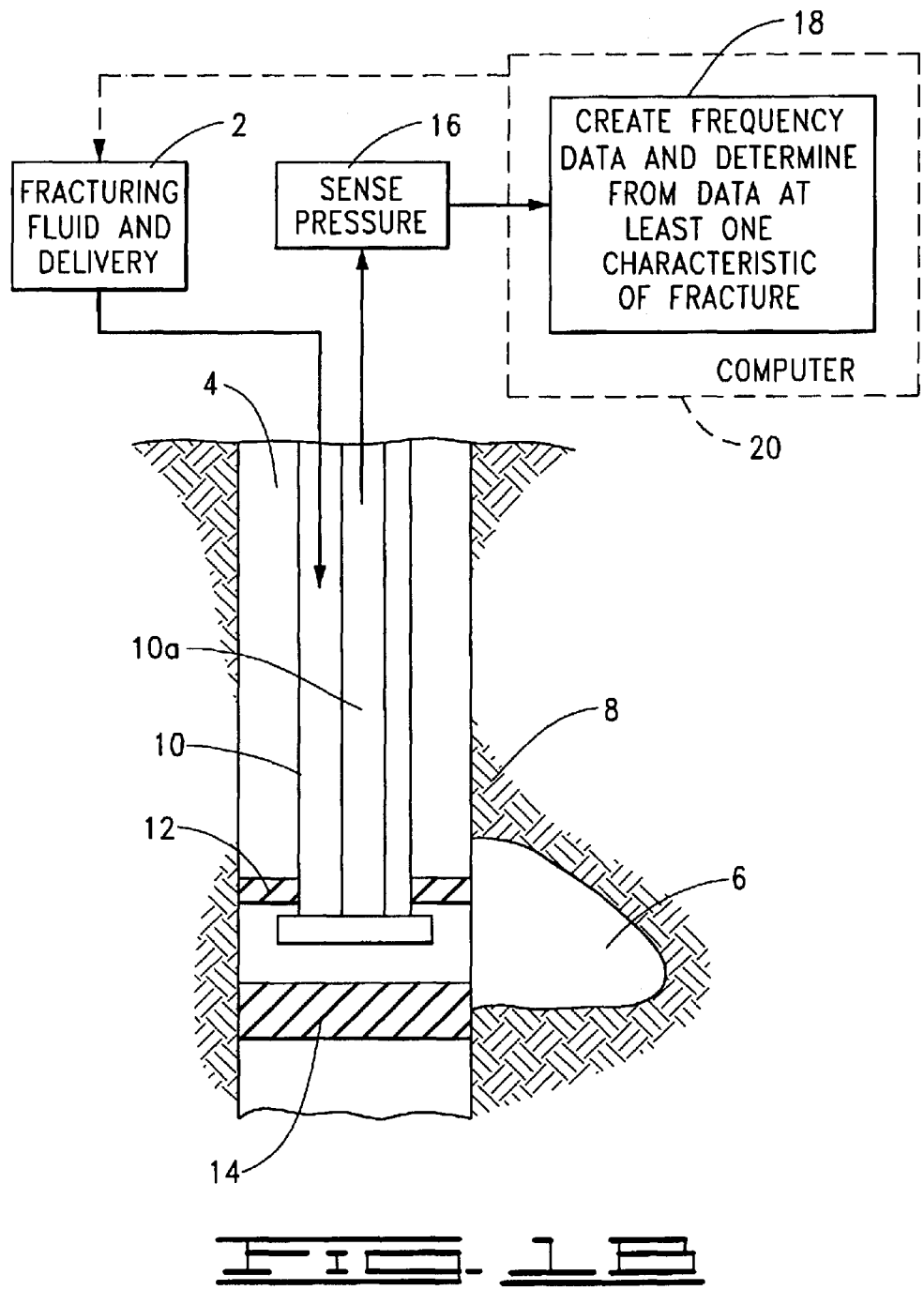
FIG. 1B represents another type of fracturing process using a method of the present invention.

The present invention is not limited to any particular fracturing fluid or fracturing fluid placement technique; therefore, other fracturing fluid and delivery can be used. One non-limiting example is of the type represented in FIG. 1B; here, fracturing fluid is pumped through tubing string 10 outside an inner tubing string 10a (in the FIG. 1B application, tubing string 10a can be referred to as a "deadstring") disposed within the tubing string 10. In the FIG. 1B representation, pressure is sensed through the deadstring. Another non-limiting example is hydrajet fracturing technology, with which fractures can be placed in cased or open vertical, deviated or horizontal well sections without the use of sealing devices such as packers and bridge plugs. In this process, represented in FIG. 1C, a dual-flow system is used in which both outer tubing string 10 and inner tubing string 10a deliver fracturing fluid through a hydrajet tool, which can also function as a perforating tool (when the hole is cased or lined) and as a sealing device using the Bernoulli principle. The sealing provided is a dynamic sealing process achieved by fluid velocity. This velocity, which is created through the jetting tool, propels fluid at velocities greater than 650 feet/second. Therefore, according to Bernoulli, pressures around the jet are quite low. Depending on local conditions, annular fluid may enter the high-velocity fluid stream into the fracture, or, because the sealing is not absolute, the jet fluid may leak off into the annulus.

The fracturing method of the present invention, with whatever fracturing fluid and delivery that may be selected, further comprises sensing pressure signals that arise during the pumping of the fracturing fluid and resultant fracture creation. Sensing of pressure can occur using any suitable technique. For example, sensing can occur downhole with real-time data telemetry to the surface or delayed transfer (for example, by data storage downhole and retrieval of the downhole sensing device or by data storage downhole and later telemetry to the surface). Such downhole sensing can be in any suitable location typically selected dependent on the specific fracturing fluid placement technique used (for example, in the tubing string (see, for example, FIG. 1A); in the isolated region (see, for example, FIG. 1B); or in the annulus if it communicates with the pressure (see, for example, FIG. 1C). Alternatively or additionally, sensing can occur at the surface. Consider, for example, that the fluid delivery system is typically the largest supplier of sound/pressure waves inside the wellbore. These pressure waves are delivered downhole by high-pressure fluids. In at least the hydrajet fracturing process, high-pressure fluid energy is transformed into high kinetic energy, and a high-frequency pressure wave is mixed into this accumulation of sound energy. In conventional fracturing technologies, these pressure/sound waves are transmitted through the treating string, but in the hydrajet fracturing approach, the annulus may serve as the better transmission conduit. In other jobs, downhole gauge readings may provide the better data to evaluate. In general, however, any sensing technique and equipment suitable for detecting the desired pressure signal(s) with adequate sensitivity/resolution can be used. Whatever pressure sensing is used, the pressure signal is provided to the surface, typically in the form of an electrical signal, as indicated by reference numeral 16 in FIG. 1.

It is known that the pressure to be sensed can change over time and that the pressure can include pressure components of various frequencies. Certain of these frequencies might be amplified by certain shape factors and dimensions of the well cavity and the fracture. For example, as the fracture 6 of the FIG. 1 illustrations grows, dominating frequencies within the composite pressure may change during the fracturing process. As a fracture develops, typically certain frequency components are amplified and the complex mixture of pressure/sound waves is transmitted back to the surface. Thus, in accordance with the present invention, the fracturing method being described with reference to the FIG. 1 illustrations also comprises, as indicated at reference numeral 18, determining frequencies at various times of the sensed pressure signals and determining from such data at least one characteristic of the fracture 6 formed by the fracturing process. This can be performed, at least in part, using a suitable computer 20 that provides an output signal to be used to control the overall fracturing process, such as controlling the pumping of the fracturing fluid or the formulating of the fracturing fluid, for example. An example of such a computer 20 includes types of conventional data acquisition systems used at well sites in the oil and gas industry as known in the art, but programmed (in software or firmware) using known programming techniques to implement the desired functions of the present invention as described herein. In accordance with the present invention, fracture behavior, including positioning of sand or proppants, can be used by such computer 20 to determine whether or not to increase flow rate or decrease proppant flow when the fracture is trying to close or screening out prematurely, or to decrease flow rate or increase proppant flow when screenout is desired.

In using the computer 20, for example, in accordance with the present invention, the computer 20 receives pressure data obtained over time from the well undergoing the fracturing process (well 4 in the illustrations of FIG. 1). Receiving such pressure data is indicated in FIG. 2 by reference numeral 22. Using the present invention, such data is transformed to frequency data at selected sampling times related to the time aspect of the pressure data; this is indicated in FIG. 2 by the reference numeral 24. From the frequency data, frequency related changes over time are identified as indicated at reference numeral 26 in FIG. 2. In a particular implementation of the present invention, decreasing or increasing ("or" being inclusive as encompassing either or both) frequency sections are identified, which decreasing/increasing is used to determine one or more characteristics of the fracture as indicated by reference numeral 27 in FIG. 2.

In making a frequency analysis of the pressure data by transforming the pressure-time data into frequency data, frequency spectrum data is created in response to pressure in the well sensed over time during the fracturing process performed on the well. Many transform methods are known in the mathematical and engineering world, such as Hilbert, Wigner and Radon Transforms, and of course Fourier Transforms. Fourier transform methods are popular in the engineering world and are particularly suitable in the present invention. In a particular implementation, this includes performing in the computer 20 (for the FIG. 1 example) a Short Time Fourier Transform (STFT) on the pressure data received in the computer; this provides frequency data for selected times of the pressure data. Wavelet technology can also be used, such as by being performed before doing the transform but in a manner to focus the later applied transform and analysis on a selected frequency range.

To use the frequency data in accordance with a particular implementation of the present invention, the aforementioned increasing or decreasing sections are identified. This identification can be performed within the computer 20, for example, such as using suitable programming to compare respective frequency spectra over the selected time slices used during the transformation from pressure to frequency data. Another identification technique includes obtaining a graphical output, such as can be provided from suitably programmed computer 20, for example, that creates a plot of the frequencies of short bursts at the various times using the STFT approach. For example, Fourier transformation is performed on a set of data points from the pressure data at a time n to the pressure data at a time m ($P_n$ to $P_m$), the next one for $P_{n+k}$ to $P_{m+k}$ where k is greater than 1, etc. for the number of pressure "slices" desired. One specific type of plot is a waterfall plot, such as of a type described further below. Note that a waterfall plot helps the human mind capture the phenomenon; while computers may not need such methods to do its decision making steps.

In a particular implementation of the present invention, determining at least one characteristic of the fracture from the frequency data includes determining, in response to a declining frequency defined by the frequency spectrum data, that the fracture is being extended by the fracturing process. This can be obtained, for example, from a waterfall plot mentioned above if in such plot there is a section of declining frequency over a period of time.

Another characteristic that can be determined is related to an increasing frequency. That is, determining at least one characteristic of the fracture includes determining, in response to an increasing frequency defined by the frequency spectrum data, that the fracture is not being extended by the fracturing process. Such increasing frequency information has been specifically related both to a fracture closing and to proppant backing up in the fracture (such as in a tip screenout event). This can be obtained, for example, from a waterfall plot mentioned above if in such plot there is a section of increasing frequency over a period of time.

The foregoing has considered the present invention in the context of a fracturing method. Following is more detailed information relevant to this, as well as to specifically the fracture monitoring method portion of the present invention.

Some important aspects of a fracture stimulation process are the measured depth of the well and the fact that fractures increase the size of the contained cavity or control volume. Fracture closure decreases this volume. Additionally, the sand or proppant filling the fracture reduces the void space. However, the measured depth of the well remains the same during the stimulation process. Therefore, a natural frequency component related to the well depth is defined by the following equation:

$$F=c/(2\times MD)$$

where F is frequency, c is the speed of sound in the fluid in the well, and MD is measured depth.

Data exhibiting frequencies lower than the one calculated in accordance with the above equation is taken as coming from inside the fracture because a frequency lower than the measured distance-related natural frequency indicates a larger distance than the measured depth of the well. On the other hand, frequencies higher than the natural frequency associated with the measured depth could be random noise or noise reflected from inside the fracture to the wellbore wall (that is, a distance shorter than the measured depth). Fracture growth or closure or packing of sand is a continuous process during which changing pressures occur downhole. The present invention obtains frequencies from such pressures using numerous transformed data sets, such as in a particular implementation using several Fourier charts created as a function of time. In accordance with the present invention, such stacked charts, or waterfall plots, quickly illustrate trends or movements in the fracture, allowing them to be identified quickly.

To facilitate the transform analysis, suitable filtering can be used to focus on selected, significant frequency ranges, for example. Wavelet technology, for example, can be used. Particularly suitable applications, but not limiting ones, include when pressure data is too complex, too noisy, or continually changing with time. Wavelets have been used in geological studies in which sound traveling through complex structures is evaluated differently from the present invention to determine the actual shape, construction, and composition of the formation. Pressure transients from a wellbore have also been evaluated differently from the present invention by using wavelet technology. In the present invention, it is contemplated that wavelets can allow closer investigation into a suspected data set or can validate a supposition created using the aforementioned Fourier analysis of the present invention, for example.

EXAMPLE 1

Well A was a vertical well that was proppant stimulated through the annulus. This well was about 8,408 feet deep (measured depth/true vertical depth).

Using the speed of sound through diesel fluid at about 3,800 feet/second and the equation set forth above, the natural frequency at the wellbore is approximately 0.226 Hz (F=3,800/(2×8,408)). FIG. 3 shows the waterfall plot of the Fourier transform charts obtained using pressure data for well A sensed through the annulus for an arrangement as in FIG. 1B. Each chart section of FIG. 3 was computed with a 16-second interval between each waterfall element. That is, each curve in the drawing represents one STFT chart of a time slot in time. The wellbore depth/length (natural) frequency component is shown as a straight dotted line 28 in FIG. 3. In this waterfall plot, locations are identified where a certain frequency amplitude exceeds a certain threshold; and the frequency movement or trend is then tracked as time progresses. Note that in the Fourier plot, amplitudes (or energy level) of lower frequency signals are greater than for higher frequencies. This is due to the fact that fluids in the wellbore tend to dampen or filter out high frequencies quickly. In the plot, we define points where frequency energy level begins to be noticeable as a "frequency front" or "wave front". With a short time interval, trends can be easily identified. In FIG. 3, these trends are represented by a solid line 30 that follows the frequency front. Identification of these trends may sometimes be difficult, and faster data-collection rates may be necessary. In many fracturing jobs, pressure data is obtained at one data set per second. Considering the natural frequency equation given above and sampling rate, frequency detection limitations, even faster sampling may be needed in shallow wells (such as wells less than 3,800 feet deep for a speed of sound in fluid factor of 3,800 feet/second).

Fracture extension or growth (increased true cavity depth) on the plot of FIG. 3 (and subsequently illustrated waterfall plots) is defined as frequency reductions, while closure or proppant front progression to the wellbore (decreased true cavity depth) is defined by frequency increase. The solid line 30 in FIG. 3 follows these variations and indicates that fracture development occurs after the 500-second point. For example, line segment 30a read against the frequency scale indicates a decrease from above 0.226 Hz to about 0.12 Hz, so there is fracture extension during the corresponding time; and line segment 30b read against the frequency scale indicates an increase back to about 0.226 Hz, so there is fracture closure or proppant buildup during the corresponding time. The substantially unchanging frequency segment of line 30 between segments 30a and 30b indicates unchanging boundaries (for example, the fracture is not extending, or it is extending but sand is building up at the same velocity so that the boundary appears to be not extending). Additionally, a few minor closures or minor screenouts occur throughout the job. The pressure data used for FIG. 3 was the annulus pressure data.

Figure 4:
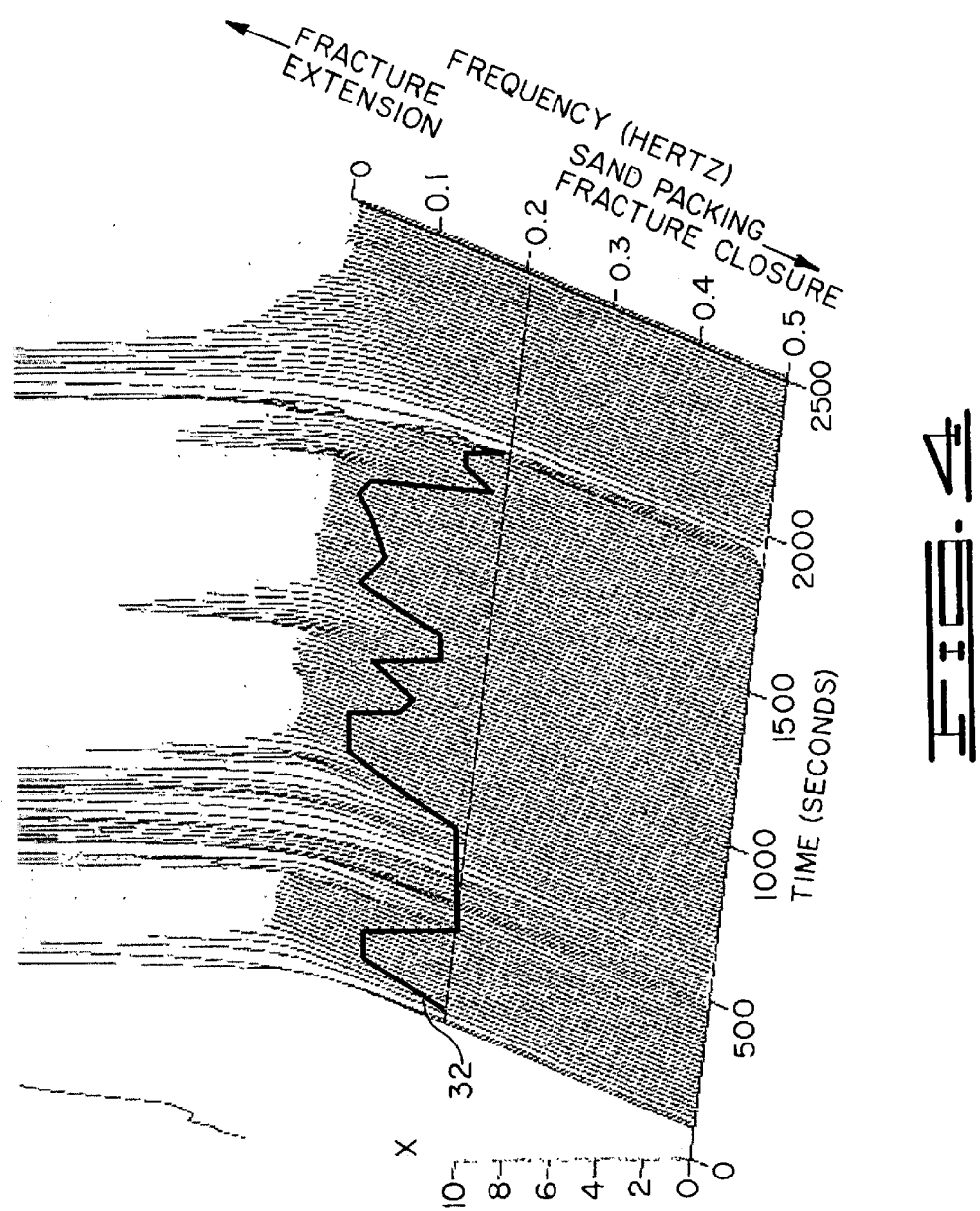
FIG. 4 shows another waterfall plot for well A in accordance with the present invention.

Well A also had open production tubing (as at tubing string 10a in FIG. 1B) through which bottomhole data was recorded. Because the fluid column did not change, downhole pressure could be recorded accurately. Obtaining the Fourier transform plots (every 16 seconds) on this data set results in the plot shown in FIG. 4. The resulting plot is much cleaner and noise effects are minimized as pressure pulses from the pumps, for example, have to travel a long distance from surface to downhole. The frequency trend is presented as a solid line 32 in this chart. The generation of the microfracture at the beginning of the job is also quite apparent in FIG. 4. Note that FIG. 4 is similar to FIG. 3 with the exception that the data is much cleaner. As each wave front depends largely upon the identifiable threshold, the Fourier wave front represented by lines 30, 32 seems only to indicate the fracture creation qualitatively. Note that this threshold can easily be changed by using different amplification schemes; so that the absolute value is definitely suspect as to quantitatively measuring a downhole feature or condition.

EXAMPLE 2

Well B was a vertical well with depth of 6,952 feet and treated using the same manner and same installation as Well A. During this time, the recording equipment was placed in the dead string (tubing) while fracturing was done through the annulus. The stimulation treatment was performed so that a screenout would occur at the end of the job to improve fracture conductivity.

Figure 5:
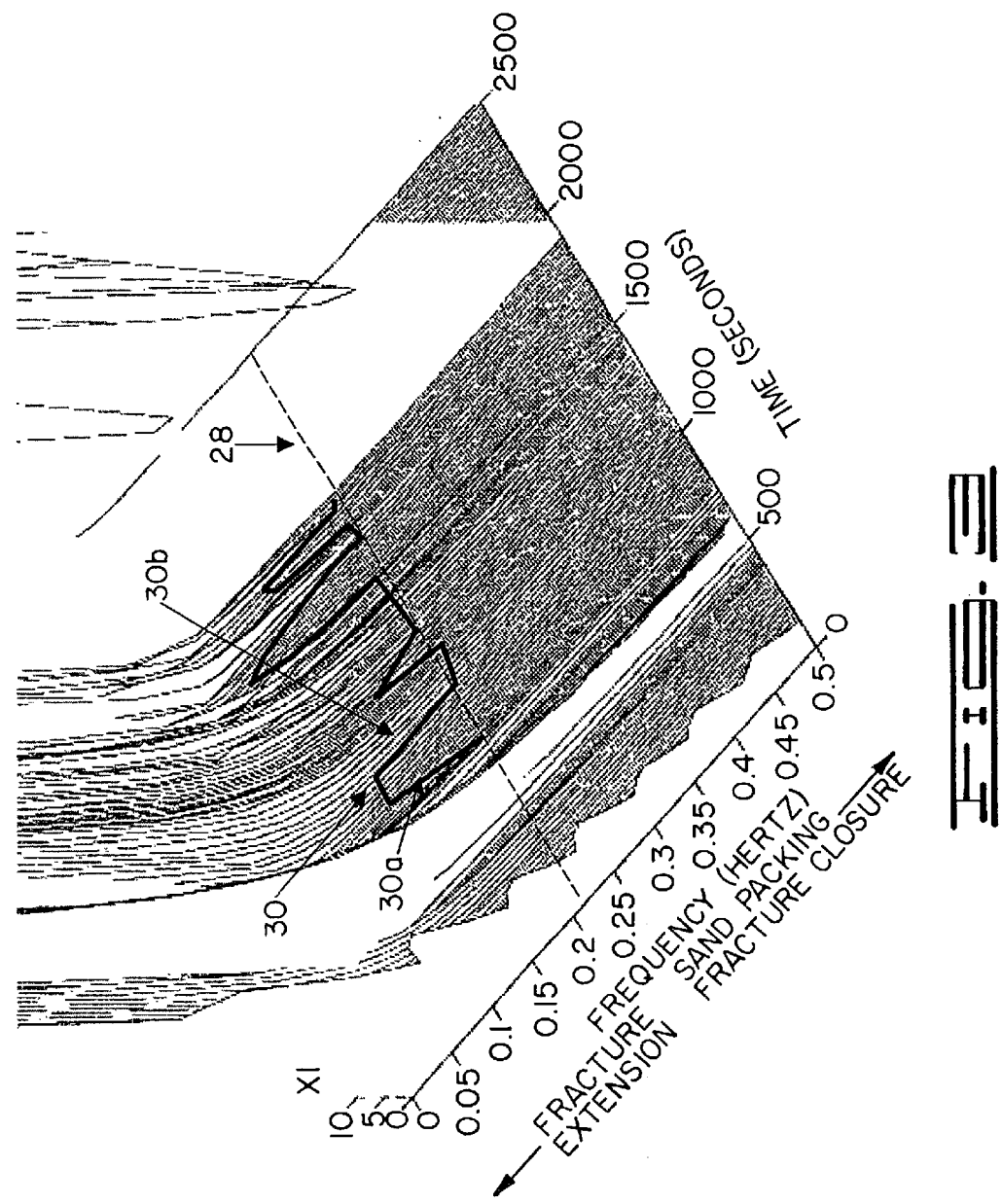
FIG. 5 shows a waterfall plot for a well B in accordance with the present invention.

The STFT stacked chart or waterfall plot obtained as part of the present invention is shown in FIG. 5. The natural frequency related to the wellbore depth and a sound speed of 3,800 feet/second as above can be computed as 0.273 Hz, as illustrated by the dotted line 34. Note that the sound speed changes from fluid to fluid and also is very dependent upon pressure and compressibility. Additionally, the extending of the fracture is clearly represented by this plot (see frequency front; as frequencies get lower), as is a massive screenout at the end of the job (frequency suddenly gets higher prior to the end of the job, significantly exceeding the 0.273 Hz line 34, as indicated by reference number 35).

As seen in FIGS. 3 through 5, the plots are quite straightforward in conventional fracturing technologies. With "conventional fracturing" it assumes that, as in FIGS. 1A and 1B, a single stream of fluid is pumped in a tubing (typically the production tubing, for example) which is open ended within the wellbore or pumped straight into the wellbore when the tubing does not exist or if no packer assemblies are installed at the end of the production tubing. An "unconventional" or "new" fracturing technique is discussed in the next paragraph. Although the plots are still qualitative in nature, they are relatively clean from other noises. In another example discussed below, jetting energy contributes a tremendous amount of noise, thus making evaluation more difficult.

Figure 1C:
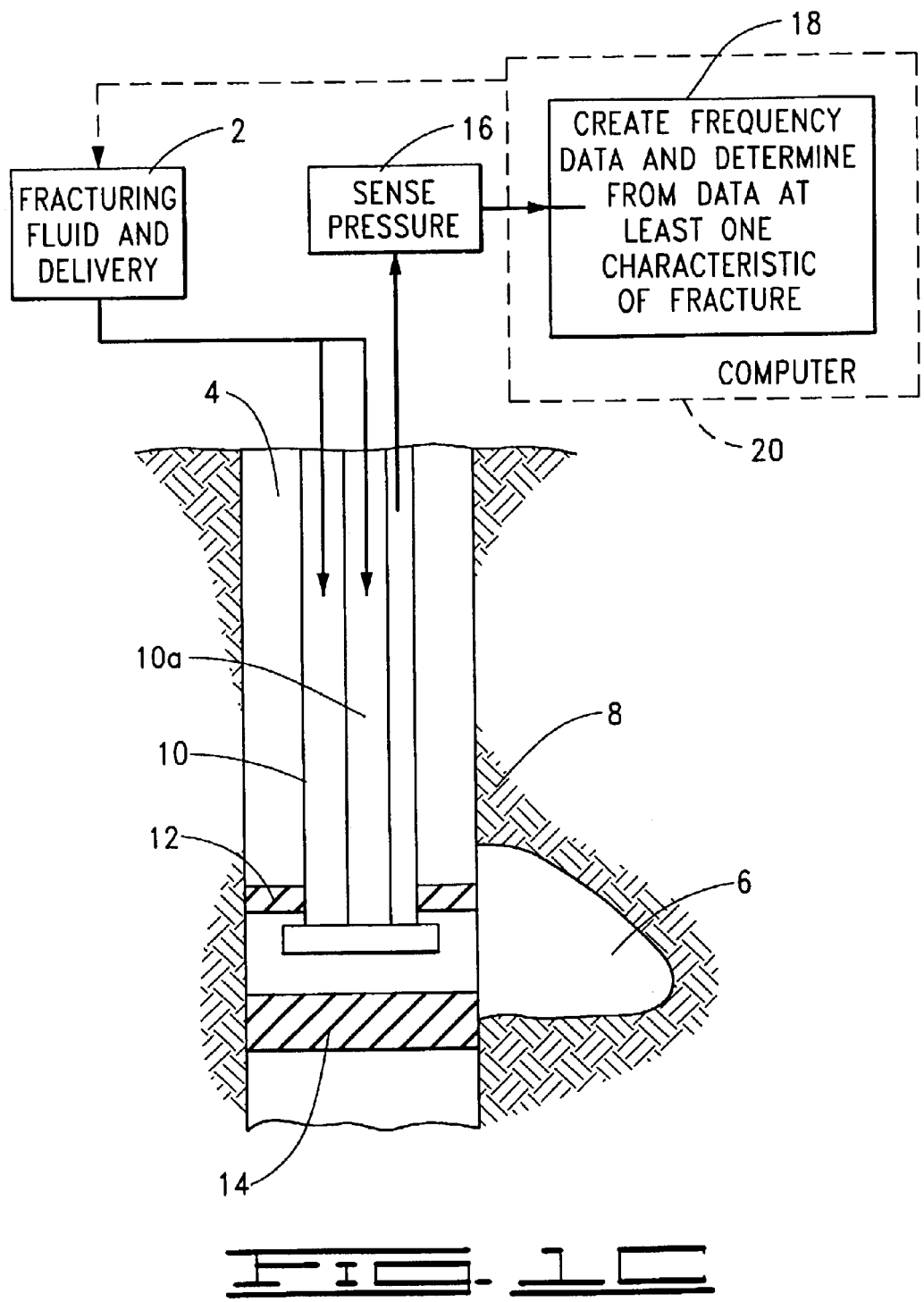
FIG. 1C represents still another type of fracturing process using a method of the present invention.

A relatively new fracturing technique, known as hydrajet fracturing (for example, one such technique is provided by Halliburton Energy Services under the mark "SurgiFrac"), employs two different flow streams, one through the tubing and the other through the annulus as represented in FIG. 1C. The inner tubing flow stream is pumped at tremendously high pressures and high flow rates (high horsepower) through jetting equipment; while the annulus flow stream between the inner and outer tubing strings is pumped at lower pressures and lower horsepower. Each of these fluid streams contributes to the noise in the system. As there is a high pressure differential across the hydrajet tool jet nozzles, fluid is accelerated to a very high velocity (up to 600–700 feet/second) which causes tremendous shearing action between the jet and the wellbore fluid; this creates tremendously high levels of noise in the system. In addition to this, the jet impacting on the wellbore walls substantially increases the noise levels, which can mask other noise components which may be needed to analyze using the present invention. Unlike conventional techniques, this new technique also generates multiple fractures at many locations in the well, and each of these fractures contributes some noise components which may affect analytical capabilities. Following are two examples of the present invention as later applied to data from two hydrajet fracture jobs.

EXAMPLE 3

Well C was slightly deviated and had a measured depth of about 10,300 feet. Lease crude was used as the primary treatment fluid.

Using a speed of sound of approximately 4,000 feet/second, a wellbore natural frequency of about 0.2 Hz is obtained. The fracture development can be observed in the Fourier transform chart in FIG. 6, which was created based on the previously obtained pressure data for Well C.

Figure 7:
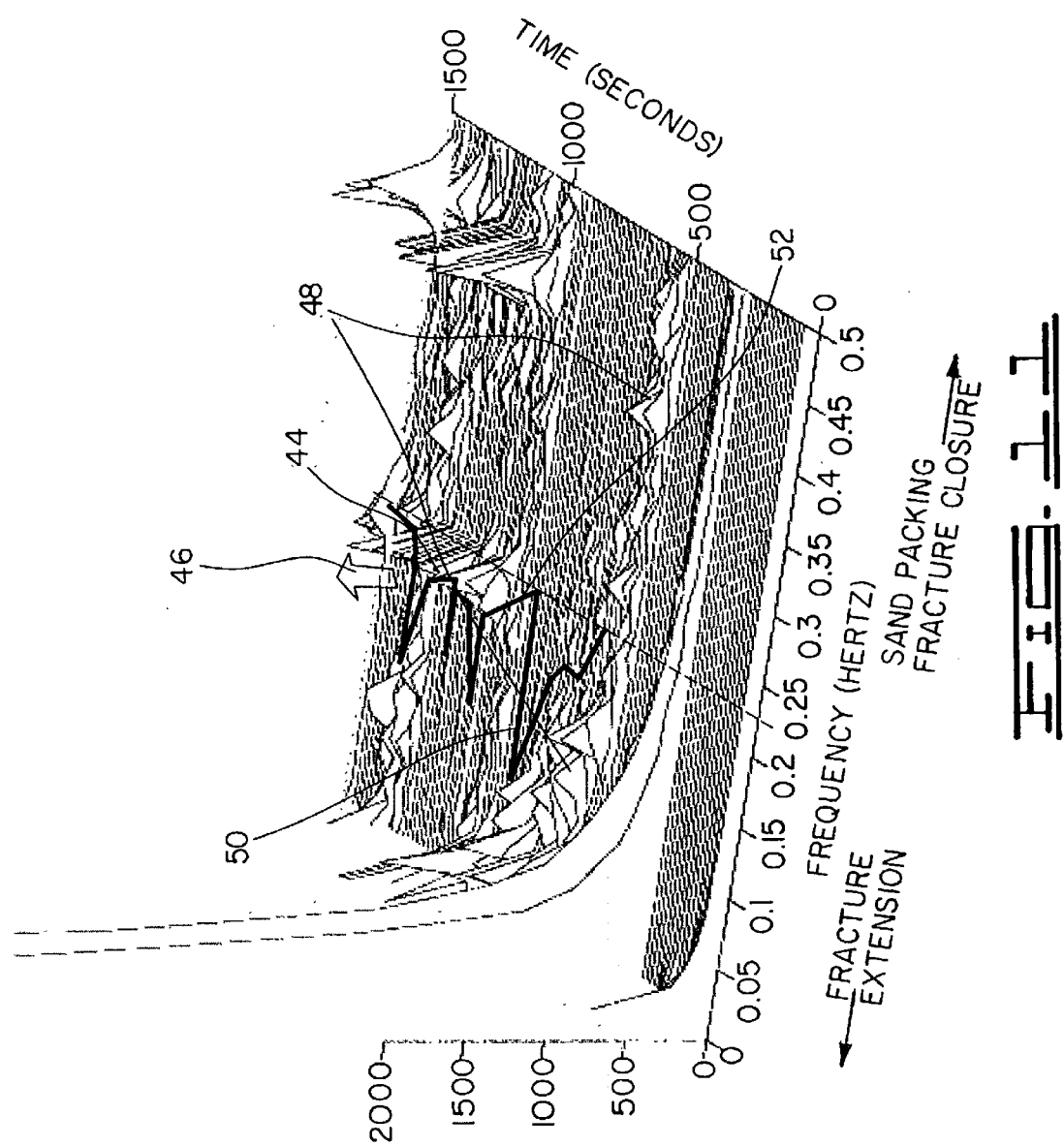
FIG. 7 shows a waterfall plot for well C in accordance with the present invention, including use of wavelet technology.

As busy as FIG. 6 is, confirming what actually happened may be done as shown by the line representing the frequency or wave front as done earlier. However, throughout the plot, there are occasionally high level bursts of noise which seems like white noise (having all frequencies present). To investigate further, wavelets are used. Using wavelet technology, the input signal (here, the pressure data) is decomposed into two sectors, which decomposition occurs in known manner to effectively filter using a selected wavelet function high/low pass filter. Each of these sectors are further decomposed into two sectors. After a few levels of such decompositions, sectors become sufficiently narrow or focused as to their frequency ranges; and for this application, a stacked plot using wavelets that were derived around the 0.2 Hz sector is shown in FIG. 7 Note that, as discussed earlier, the wellbore natural frequency is about 0.2. By selecting the area around 0.2, noise elements with frequencies around 0.2 are amplified while the others are impeded to essentially zero. Essentially, frequencies away from the wellbore basic frequencies are eliminated or filtered by use of wavelet technology to improve clarity as fractures extend from the wellbore. Known wavelet filters include gaussian, mexican hat, morlets, daubechies, and many more forms well known in the art, and the present invention is not limited to any particular wavelet filter. Using this filtering the effects of the high level, lower frequencies, are drastically reduced; and frequencies of interest (such as the frequency front discussed earlier) are now represented by frequency peaks. From the frequency peaks, we can identify slow movements of these peaks in the stacked plots and these moving peaks can be seen as ridges. Using these ridges can give better quantitative definition to the selected results (quantitatively as to relationship to frequency in the plot and possibly as to quantitative analysis or information that can be derived therefrom). In FIG. 7, the tremendous amount of "stray" noise coming from turbulence, etc., causes a flurry of peaks which makes the selection of the "real" ridge difficult. However, concentrating on ridges that originate from the 0.2 area (which is the wellbore surface) the fracture development is clearly demonstrated by arrow 36, until the perturbation by an experiment that had been performed on the well (two successive reductions of annular flow rate by 1.5 barrels/minute each). Arrow 36 marks a declining ridge of the waterfall plot, thereby indicating fracture growth; arrow 38 marks an increasing ridge, thereby indicating screenout due to the experiment; and arrow 40 indicates a subsequent fracture growth period, when annular flow rate had been restored.

An interesting phenomenon exists during the "flow perturbation" experiment. To show this more clearly, a stacked wavelet plot was created and focused around the time the flow perturbations were made (that is, a portion of the plot of slices shown in FIG. 7 was focused on). Again, frequencies away from the wellbore basic frequencies are eliminated or filtered. This plot is shown in FIGS. 8 and 9 (which have their own time references, thus marked differently than in FIG. 7). FIG. 8 shows the plot region indicating that the fracture starts to close, while FIG. 9 shows the other side of this plot as screenout is in progress. The high peaks in these plots form an almost straight ridge on the left side of FIG. 8 and on the right side of FIG. 9, which is observed from the other side of FIG. 8. The other peak also forms a straight ridge; and this ridge is quite straight, centering and staying stationary at 0.2 (thus probably reflecting from the wellbore fracture entry correlated to our earlier mentioned wellbore function; note that this stationary behavior at 0.2 can be better seen from FIG. 9). The ridge formed by the high peaks moves slowly toward the lower frequency. In FIG. 8, an apparent ridge connects to the tall ridge on the left, which probably relates to the fracture extension. This is indicated by arrow 42*a*. At the time corresponding with the end of the arrow 42*a*, the flow rate was reduced by 1.5 barrels per minute (BPM) and suddenly, the ridge stayed stationary if not slightly moving to a higher frequency. It can be theorized that the fracture is extending a little, but counteracted by sand packing (front distance remains the same). When the flow is again reduced by 1.5 BPM, the frequency peak suddenly increases rapidly, even exceeding the 0.2 frequency. This indicates sudden closure of the fracture combined with sand screenout rapidly moving in the direction of the wellbore, and some of the sand, after a few seconds, starts to "populate" the wellbore. This is indicated by arrow 42b in FIGS. 8 and 9. The flow rate was again increased, and immediately the ridge moved back to below the 0.2 mark (see arrow 42c in FIG. 9). One aspect of these two plots of FIGS. 8 and 9 is that the wellbore frequency and the fracture-tip frequency have high peaks and their values are fixed during the stoppage. As soon as sand buildup becomes significant, the frequency is replaced by a weaker front, which may indicate that the sand pack is not yet consolidated.

EXAMPLE 4

Well D was a horizontal well stimulated using hydrajet fracturing technology. The well's true vertical depth was approximately 6,500 feet with measured depth of about 8,704 feet.

A first fracturing treatment produced the annulus pressure and the downhole proppant concentration data as shown in FIG. 10. A stacked Fourier plot created later from this data of FIG. 10 for this stimulation stage is shown in FIG. 11. Solid line 44 identifies the fracture tip movement or the proppant front movement. Sharp peaks, such as at 48, identify tremendous white noise, which often indicates something major has occurred, such as initial fracture development. In the beginning, good fracture growth is shown to have been obtained; however, as a certain fracture length was achieved, leakoff became substantial and the fracture slowly stopped growing as indicated by the graph at reference numeral 50. The boost pressure was increased to stagnation pressure, which reopened the fracture (more white nose) as indicated at reference numeral 52 in the plot of FIG. 11. In general, a good, but not large, fracture trend occurred, shown by arrow 46 in FIG. 11.

Figure 13:
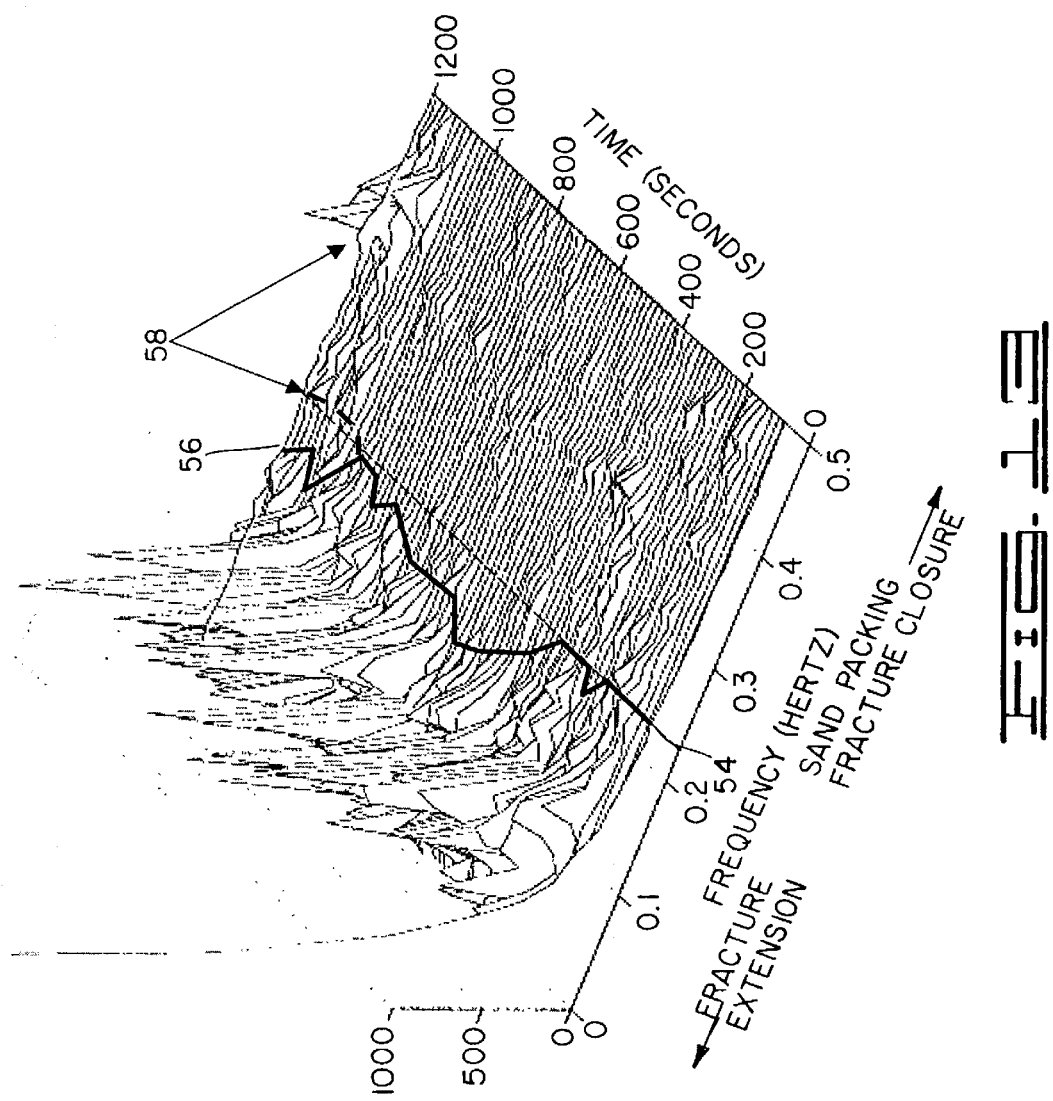
FIG. 13 shows a waterfall plot created from the data of FIG. 12 in accordance with the present invention.

After the first fracture was completed, the coiled tubing moved the jetting tool to a second fracture location. The annulus pressure and downhole proppant concentrations for this second fracturing are plotted in FIG. 12. In this stage, no distinct difficulties are observable in the fracture development, as indicated by the left movement of solid line 54 in FIG. 13, which figure shows a waterfall plot later developed from the data of FIG. 12. Toward the end of the stage, there seems to be a confusing situation—one curve shows more extension (see reference numeral 56), but the peaks 58 on the right side of the figure could also be interpreted as the continuation of the curve. In this case, a late minor screenout may have occurred at the end of the stage.

Figure 14:
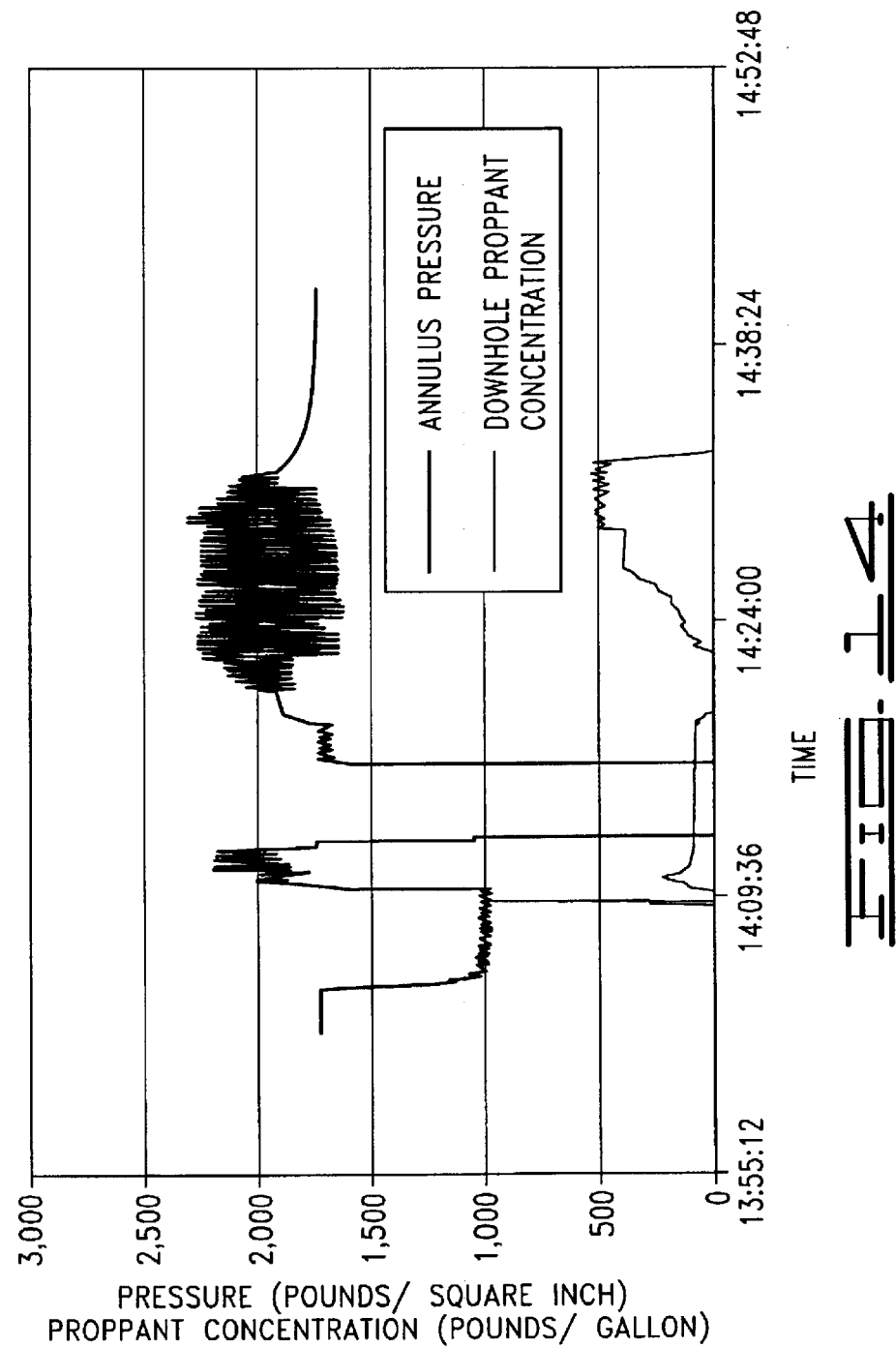
FIG. 14 shows plots of annulus pressure and downhole proppant concentration data for a third fracture of well D.
Figure 15:
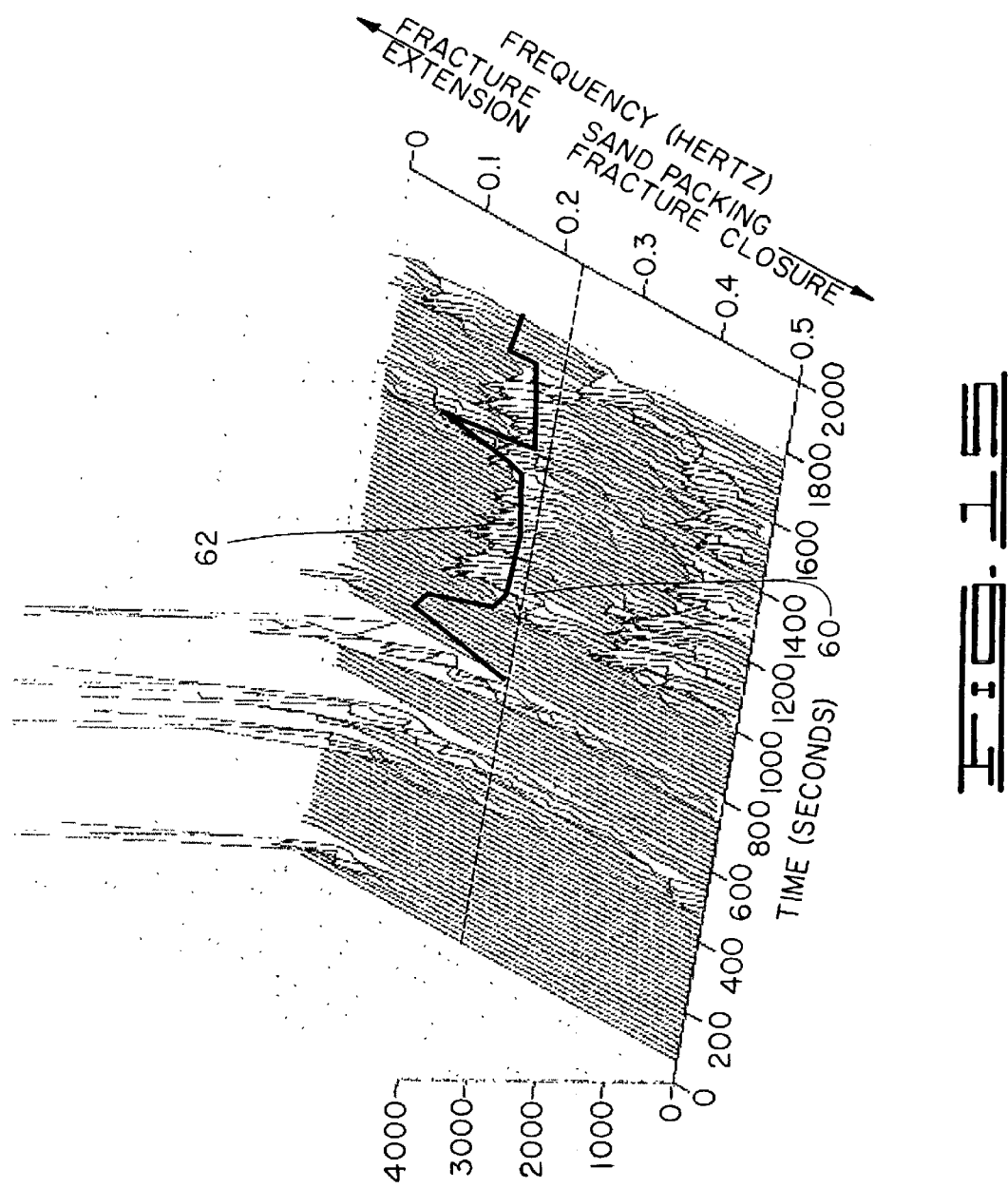
FIG. 15 shows a waterfall plot created from the data of FIG. 14 in accordance with the present invention.
Figure 16:
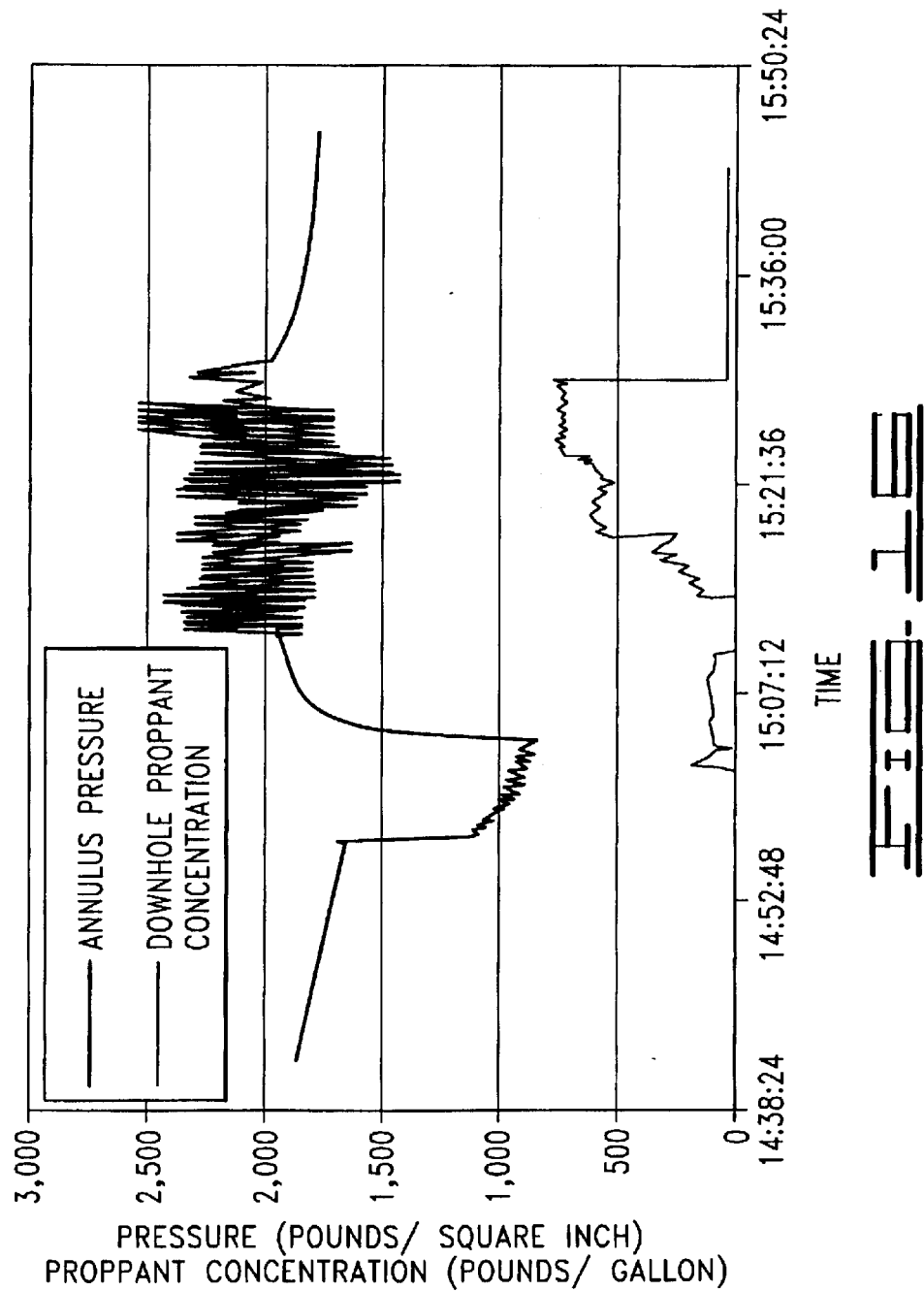
FIG. 16 shows plots of annulus pressure and downhole proppant concentration data for a fourth fracture of well D.
Figure 17:
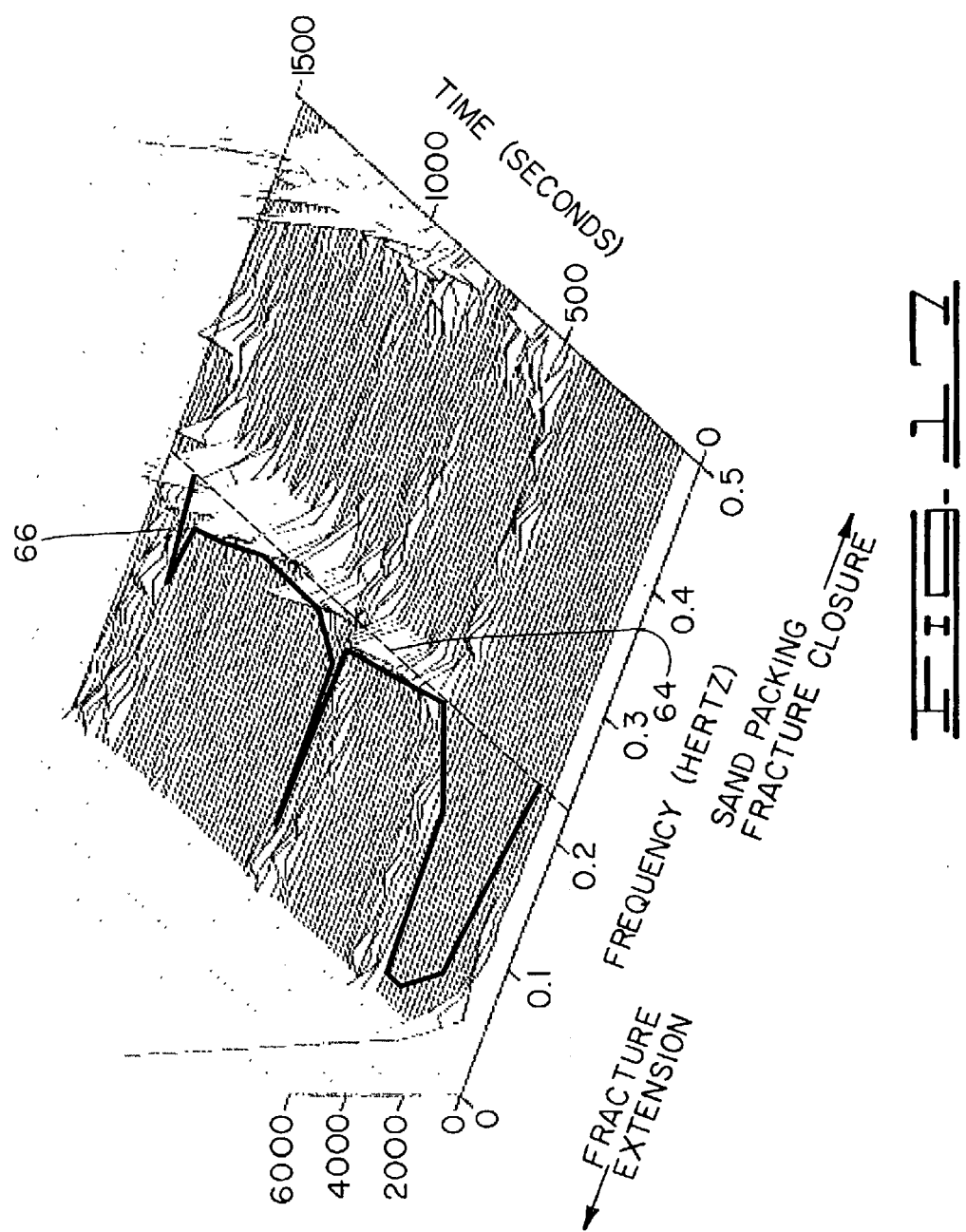
FIG. 17 shows a waterfall plot created from the data of FIG. 16 in accordance with the present invention.

A third fracture of well D is shown in FIGS. 14 and 15, and a fourth stage of fracturing in well D is shown in FIGS. 16 and 17. In FIGS. 15 and 17, the fracture fronts are indicated to grow as planned, as observed by the solid fracture front line 62 (FIG. 15) and 66 (FIG. 17). Note again in the present invention, that fractures are taken to grow if the front line moves to the low frequency side of the wellbore natural frequency line (dotted lines 60, 64 in FIGS. 15, 17, respectively)

Figure 18:
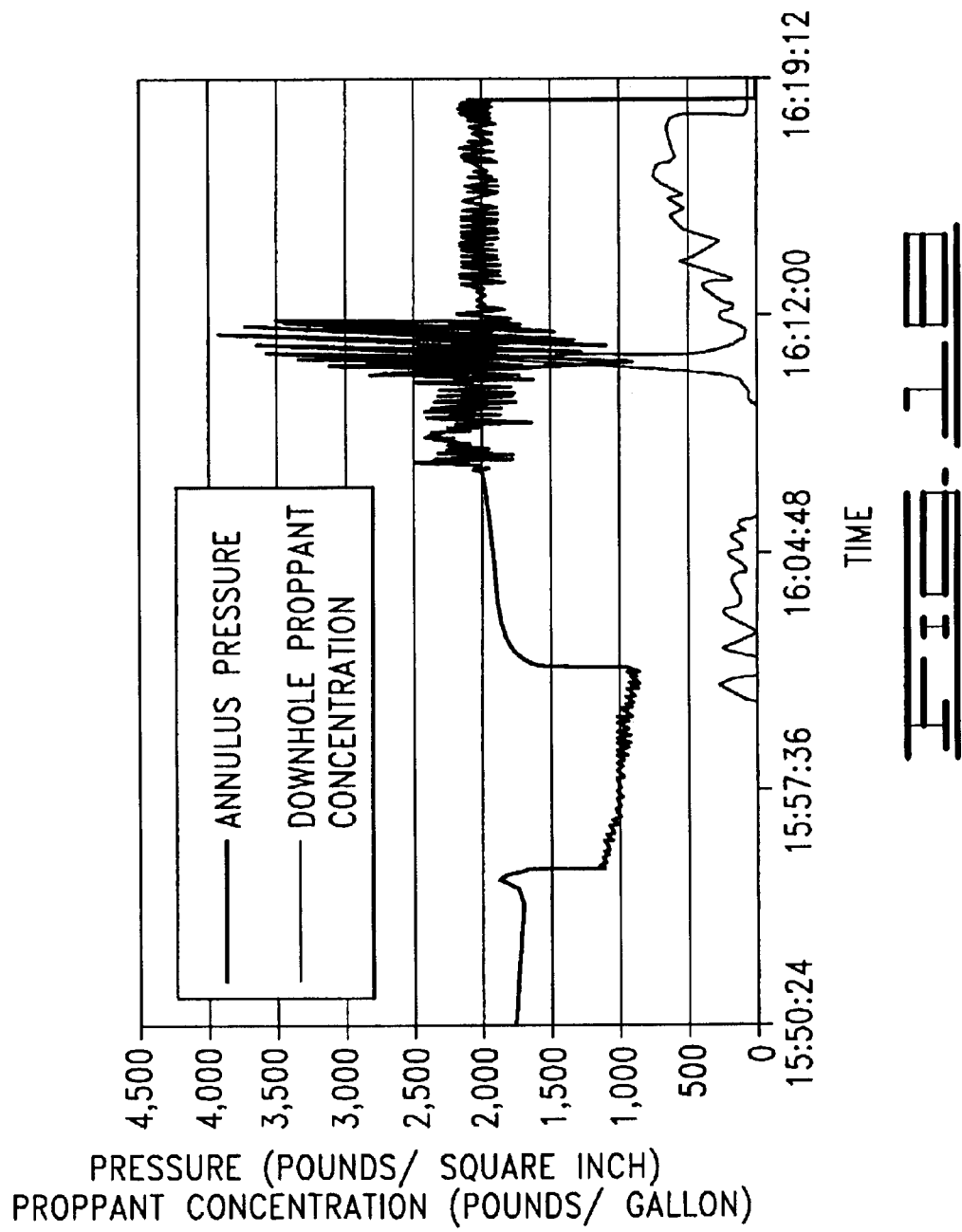
FIG. 18 shows plots of annulus pressure and downhole proppant concentration data for a fifth fracture of well D.
Figure 19:
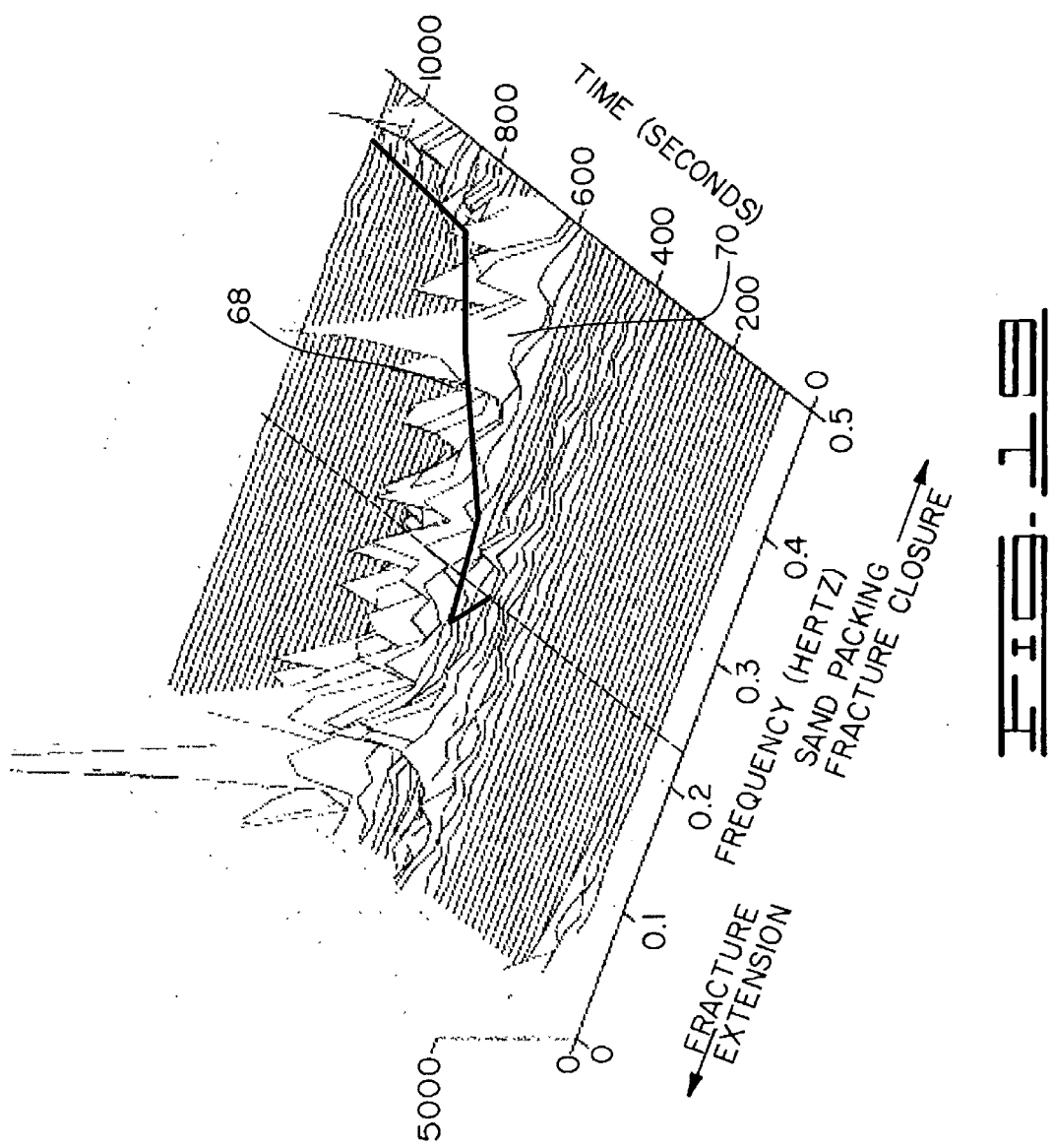
FIG. 19 shows a waterfall plot created from the data of FIG. 18 in accordance with the present invention.

FIGS. 18 and 19 relate to a fifth fracturing in well D, with FIG. 18 representing recorded pressure and proppant concentration data at the time, and FIG. 19 showing a later developed waterfall plot using the earlier data. FIG. 18 indicates that something happened during this job because proppant concentrations suddenly jump to about 12.5 pounds per gallon (lb/gal). FIG. 19 shows that screenout occurred almost instantaneously after the sudden increase of proppant concentration downhole. This is evident by the curve 68 moving rapidly to the right (no evidence of staying within the left side of the dotted line) and also the tremendous noise activities 70 at high frequencies.

From the foregoing, a particular implementation of the present invention includes using a waterfall plot to identify at least one of a declining ridge section for a selected frequency range over a period of time and an increasing ridge section for the selected frequency range. In at least some applications, using the waterfall plot includes identifying a section of declining frequency over a first period of time and a section of increasing frequency over a second period of time. This information indicates either fracture growth (declining ridge) or fracture growth stoppage such as, for example, closure or screenout (increasing ridge).

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A fracture monitoring method, comprising:
   creating frequency spectrum data in response to a pressure in a well sensed over time during a fracturing process performed on the well; and
   determining from the frequency spectrum data at least one characteristic of a fracture formed by the fracturing process, in response to a declining frequency defined in the frequency spectrum data, that the fracture is being extended by the fracturing process.

2. The fracture monitoring method as defined in claim 1, wherein another characteristic includes determining, in response to an increasing frequency defined in the frequency spectrum data, that the fracture is closing or that proppant is backing up in the fracture.

3. A fracture monitoring method, comprising:
   sensing pressure over time during a fracturing process performed on a well such that pressure data is obtained;
   making a frequency analysis of the pressure data, including making a waterfall plot of frequency data obtained in response to the pressure data; and
   using the waterfall plot to determine at least one characteristic of a fracture formed by the fracturing process.

4. A fracture monitoring method as defined in claim 3, wherein using the waterfall plot includes identifying at least one of a declining ridge section for a selected frequency range over a period of time and an increasing ridge section for the selected frequency range.

5. A fracture monitoring method as defined in claim 3, wherein using the waterfall plot includes identifying a section of declining frequency within a selected frequency range over a first period of time and a section of increasing frequency within the selected frequency range over a second period of time.

6. A fracture monitoring method as defined in claim 3, wherein using the waterfall plot includes determining a section of declining frequency for a frequency range over a period of time.

7. A fracture monitoring method as defined in claim 3, wherein using the waterfall plot includes determining a section of increasing frequency for a frequency range over a period of time.

8. A fracture monitoring method as defined in claim 3, wherein:
the method further comprises filtering the pressure data; and
making a frequency analysis is performed on the filtered pressure data.

9. A fracture monitoring method as defined in claim 8, wherein making a frequency analysis further includes applying a frequency transform to the filtered pressure data to provide transform data for use in making the waterfall plot.

10. A fracture monitoring method as defined in claim 9, wherein the frequency transform is a Fourier Transform.

11. A fracture monitoring method as defined in claim 9, wherein the frequency transform is a Short Time Fourier Transform.

12. A fracture monitoring method as defined in claim 8, wherein filtering includes wavelet filtering.

13. A fracture monitoring method as defined in claim 12, wherein making a frequency analysis further includes applying a frequency transform to the wavelet filtered pressure data to provide transform data for use in making the waterfall plot.

14. A fracture monitoring method as defined in claim 13, wherein the frequency transform is a Fourier Transform.

15. A fracture monitoring method as defined in claim 13, wherein the frequency transform is a Short Time Fourier Transform.

16. A fracture monitoring method as defined in claim 3, wherein making a frequency analysis further includes applying a frequency transform to the pressure data to provide transform data for use in making the waterfall plot.

17. A fracture monitoring method as defined in claim 16, wherein the frequency transform is a Fourier Transform.

18. A fracture monitoring method as defined in claim 16, wherein the frequency transform is a Short Time Fourier Transform.

19. A computer-implemented fracture monitoring method, comprising:
receiving in a computer pressure data obtained over time from a well undergoing a fracturing process;
performing in the computer a transform on pressure data received in the computer to provide frequency data for selected times of the pressure data; and
using the frequency data to determine whether a fracture created by the fracturing process is extending, including determining decreasing and increasing frequency sections within the frequency data.

20. A computer-implemented fracture monitoring method as defined in claim 19, wherein using the frequency data further includes creating a waterfall plot of the frequency data over the selected times.

21. A computer-implemented fracture monitoring method as defined in claim 19, wherein:
the method further comprises filtering the pressure data in the computer; and
performing a transform is performed on the filtered pressure data.

22. A computer-implemented fracture monitoring method as defined in claim 21, wherein the transform is a Fourier Transform.

23. A computer-implemented fracture monitoring method as defined in claim 21, wherein the transform is a Short Time Fourier Transform.

24. A computer-implemented fracture monitoring method as defined in claim 21, wherein filtering includes wavelet filtering.

25. A computer-implemented fracture monitoring method as defined in claim 24, wherein the transform is a Fourier Transform.

26. A computer-implemented fracture monitoring method as defined in claim 24, wherein the transform is a Short Time Fourier Transform.

27. A computer-implemented fracture monitoring method as defined in claim 19, wherein the transform is a Fourier Transform.

28. A computer-implemented fracture monitoring method as defined in claim 19, wherein the transform is a Short Time Fourier Transform.

29. A fracturing method, comprising:
pumping a fracturing fluid into a well such that a fracture in an adjacent formation forms and pressure signals are generated;
sensing the pressure signals;
determining frequencies at various times of the sensed pressure signals;
creating a plot of the frequencies at the various times; and
determining from the plot whether the fracture is extending into the formation.

30. A fracturing method as defined in claim 29, wherein determining whether the fracture is extending includes identifying frequency range sections of increasing frequency and frequency range sections of decreasing frequency.

31. A fracturing method as defined in claim 29, further comprising controlling further pumping of the fracturing fluid in response to determining whether the fracture is extending.

32. A fracturing method as defined in claim 31, wherein:
the method further comprises filtering the sensed pressure signals to provide filtered pressure data signals; and
determining frequencies is performed on the filtered pressure data signals.

33. A fracturing method as defined in claim 32, wherein determining frequencies includes applying a frequency transform to the filtered pressure data signals.

34. A fracturing method as defined in claim 33, wherein the frequency transform is a Fourier Transform.

35. A fracturing method as defined in claim 33, wherein the frequency transform is a Short Time Fourier Transform.

36. A fracturing method as defined in claim 32, wherein filtering includes wavelet filtering.

37. A fracturing method as defined in claim 36, wherein determining frequencies includes applying a frequency transform to the wavelet filtered pressure data signals.

38. A fracturing method as defined in claim 37, wherein the frequency transform is a Fourier Transform.

39. A fracturing method as defined in claim 37, wherein the frequency transform is a Short Time Fourier Transform.

40. A fracturing method as defined in claim 29, wherein determining frequencies includes applying a frequency transform to the sensed pressure signals.

41. A fracturing method as defined in claim 40, wherein the frequency transform is a Fourier Transform.

42. A fracturing method as defined in claim 40, wherein the frequency transform is a Short Fourier Transform.

* * * * *